(12) United States Patent
Ohashi

(10) Patent No.: US 6,778,167 B2
(45) Date of Patent: Aug. 17, 2004

(54) COORDINATE READING DEVICE

(75) Inventor: Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 366 days.

(21) Appl. No.: 09/944,351

(22) Filed: Sep. 4, 2001

(65) Prior Publication Data

US 2002/0041272 A1 Apr. 11, 2002

(51) Int. Cl.[7] .................................................. G09G 5/00
(52) U.S. Cl. ....................... 345/173; 345/156; 345/174; 345/179; 345/586; 178/18.01; 178/19.03; 235/449
(58) Field of Search ................................ 345/173, 179, 345/157, 174, 177, 176, 427, 586, 156; 178/18.01, 19.03; 235/449

(56) References Cited

U.S. PATENT DOCUMENTS

| | | | |
|---|---|---|---|
| 4,730,186 A | * 3/1988 | Koga et al. | .................. 345/179 |
| 5,136,125 A | 8/1992 | Russell | |
| 5,635,959 A | * 6/1997 | Takeuchi et al. | ............. 345/179 |
| 5,751,229 A | 5/1998 | Funahashi | |
| 5,854,881 A | * 12/1998 | Yoshida et al. | .............. 345/104 |
| 6,246,393 B1 | * 6/2001 | Watanabe et al. | ........... 345/173 |
| 6,525,676 B2 | * 2/2003 | Kisaichi et al. | ................ 341/22 |
| 6,597,347 B1 | * 7/2003 | Yasutake | ..................... 345/173 |

FOREIGN PATENT DOCUMENTS

| | | |
|---|---|---|
| EP | 0 743 612 A1 | 11/1996 |
| JP | 5-165560 A | 7/1993 |

OTHER PUBLICATIONS

U.S. patent application Ser. No. 09/636,818, Okamoto et al., filed Aug. 10, 2000.
U.S. patent application Ser. No. 09/634,322, Nagai et al., filed Aug. 7, 2000.
U.S. patent application Ser. No. 09/666,892, Wakayama et al., filed Sep. 20, 2000.
U.S. patent application Ser. No. 09/659,754, Tomomatsu, filed Sep. 11, 2000.
U.S. patent application Ser. No. 09/628,724, Nagai et al., filed Jul. 28, 2000.

* cited by examiner

*Primary Examiner*—Xiao Wu
*Assistant Examiner*—Abbas I Abdulselam
(74) *Attorney, Agent, or Firm*—Oliff & Berridge, PLC

(57) ABSTRACT

When a voltage difference diff of a vertex (maximum value) of a standard Position Resolving Table (PRT) is Dps, the voltage difference diff of a vertex (maximum value) of a tilted PRT is Dp, an amount of shift of the vertex in a horizontal direction is ΔS, and a half of a coil placement pitch is Ls/2, a ratio of Dps to Dp (Gain) is equal to Dps/Dp (Gain=Dps/Dp). A value showing a proportion of a displacement of the vertex of the titled PRT with respect to the vertex of the standard PRT and the range of Ls/2 (Slide) is equal to ΔS/(Ls/2). Therefore, a positional error due to a tilt of a stylus or a change in a battery voltage can be corrected.

12 Claims, 36 Drawing Sheets

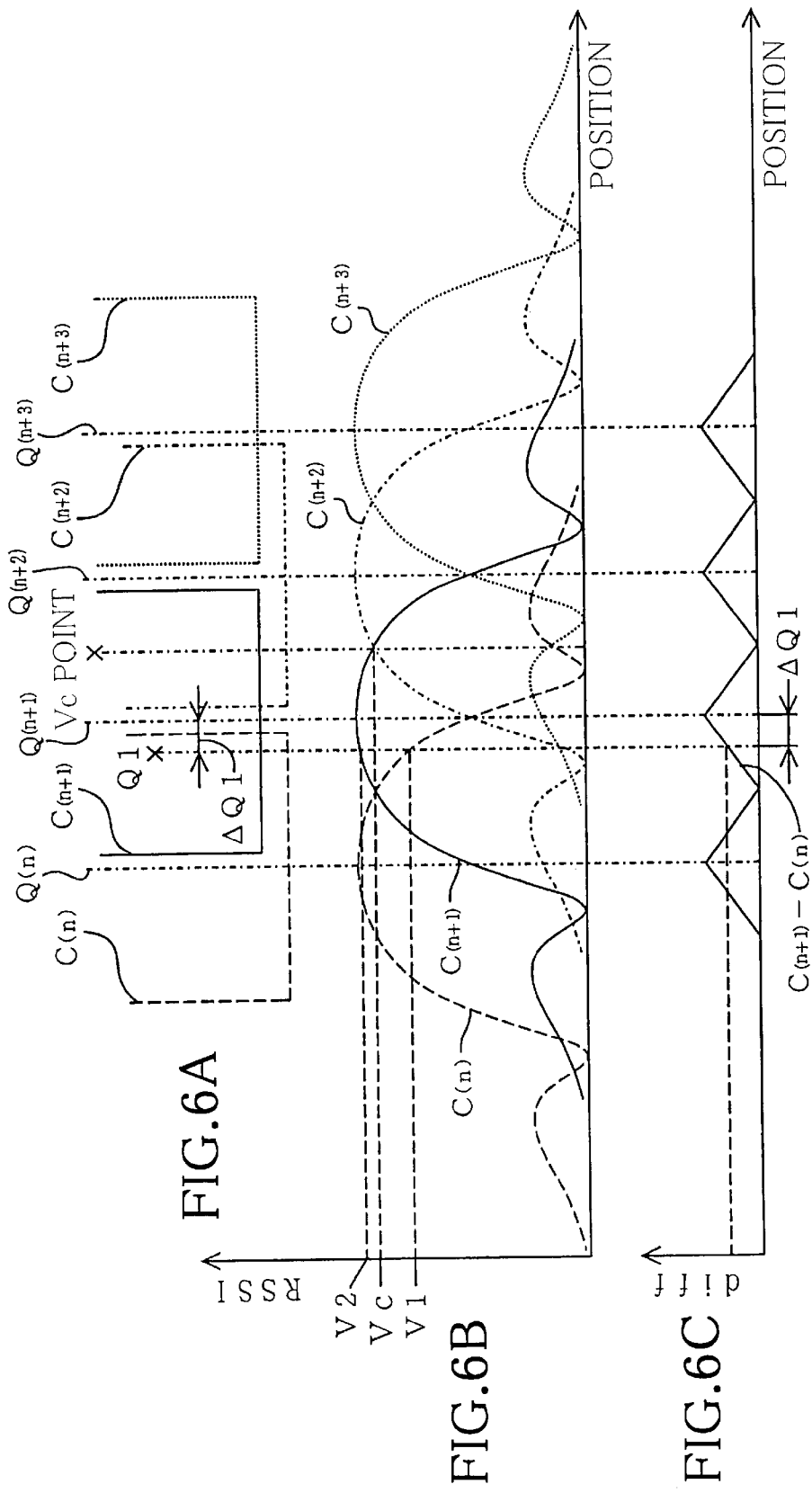

PRINCIPLE OF LINEAR CORRECTION

Gain = Dps/Dp
Slide = ΔS/(Ls/2)

FIG. 14

SELECTED DATA

| VOLTAGE \ ANGLE | 0° | 10° | 20° | 30° | |
|---|---|---|---|---|---|
| 1.3V | 415 | 424 | 443 | 478 | Dp |
| | 371 | 377 | 387 | 401 | Vc |
| | 4.0 | 4.75 | 5.25 | 5.75 | ΔS |
| | 1.006 | 1.433 | 1.983 | 2.705 | Rs |
| 1.4V | 450 | 457 | 475 | 506 | Dp |
| | 410 | 414 | 424 | 435 | Vc |
| | 4.0 | 4.75 | 5.25 | 6.00 | ΔS |
| | 1.011 | 1.417 | 1.963 | 2.680 | Rs |
| 1.5V | 479 | 485 | 504 | 539 | Dp |
| | 445 | 449 | 459 | 477 | Vc |
| | 4.0 | 4.75 | 5.25 | 6.00 | ΔS |
| | 1.010 | 1.405 | 1.953 | 2.657 | Rs |
| 1.6V | 504 | 512 | 527 | 564 | Dp |
| | 481 | 483 | 491 | 505 | Vc |
| | 4.25 | 4.75 | 5.50 | 6.00 | ΔS |
| | 1.004 | 1.403 | 1.933 | 2.608 | Rs |

STYLUS MOVING AMOUNT

STYLUS MOVING AMOUNT

FIG. 25

DETECTED BATTERY VOLTAGE

| VOLTAGE \ ANGLE | 0° | 10° | 20° | 30° |
|---|---|---|---|---|
| 1300mV | 1300 | 1292 | 1289 | 1298 |
| 1400mV | 1400 | 1393 | 1399 | 1399 |
| 1500mV | 1500 | 1494 | 1496 | 1501 |
| 1600mV | 1613 | 1594 | 1580 | 1557 |

VOLTAGE DIFFERENCES (diff) IN ONE COIL PITCH DUE TO TILT OF STYLUS

BATTERY VOLTAGE: 1500 mV
TILT ANGLE OF STYLUS: 0 degree : ⊕
10 degrees : ×
20 degrees : ◇
30 degrees : ▫

AMOUNT OF DEVIATION WITH DYNAMIC CORRECTION

POSITION DETERMINATION GRAPH
WHEN STYLUS IS TILTED TOWARD OPPOSITE DIRECTION

COORDINATE READING DEVICE

BACKGROUND OF THE INVENTION

1. Field of Invention

The invention relates to a coordinate reading device that reads a coordinate of a position of a coordinate input device, in accordance with a signal generated on a plurality of coils laid in a coordinate input sheet by an alternating magnetic field generated from the coordinate input device.

2. Description of Related Art

FIG. 35 shows a structure of a conventional coordinate reading device. (Japanese Laid-Open Patent Publication No. 5-165560).

The coordinate reading device shown in FIG. 35 includes a tablet (coordinate input sheet) 91, a scanning circuit 92, and a detection circuit 90. The tablet 91 is provided with a plurality of X-sense coils X1 to Xm for detecting X-coordinates of a stylus (coordinate input device) 100 and Y-sense coils Y1 to Yn for detecting Y-coordinates of the stylus 100. The scanning circuit 92 serially scans the sense coils X1 to Xm and Y1 to Yn in the tablet 91. The detection circuit 90 calculates the X- and Y-coordinates of the stylus 100 by detecting induction signals generated at the sense coils X1 to Xm and Y1 to Yn.

The stylus 100 includes a coil 101 that generates an alternating magnetic field. When the stylus 100 contacts the tablet 91, some sense coils located near the stylus 100 generate induction signals 97 due to magnetic coupling with the alternating magnetic field from the coil 101. Selection signals 98, that serially specify the sense coils X1 to Xm and Y1 to Yn to detect the respective introduction signals 97 generated at the sense coils X1 to Xm and Y1 to Yn, are inputted into the scanning circuit 92. The induction signals 97 are inputted into the detection circuit 90. The inputted induction signals 97 are amplified at an amplifier 93 where the amplitude is detected at an amplitude detection circuit 94. Next, an A/D conversion circuit 95 converts the measured amplitude into digital values, and outputs the digital values to a CPU 96. The CPU 96 calculates a positional coordinate of the stylus 100 based on the inputted digital values from the A/D conversion circuit 95. For example, the CPU 96 may refer to a coordinate table that stores data indicative of a relationship between a plurality of digital values and coordinate positions. The CPU 96 selects a positional coordinate that corresponds to the digital values presently inputted from the A/D conversion circuit 95.

When the stylus 100 is tilted against a coordinate input plane of the tablet 91, a distribution of the alternating magnetic field generated from the coil 101 is changed. Therefore, a voltage generated on the sense coils is changed.

However, the digital values in the coordinate table used in the conventional coordinate reading device are measured in advance, based on the voltage generated at the sense coils due to the magnetic coupling with the alternating magnetic field from the coil 101 when a center axis of the stylus 100 is perpendicular to the coordinate input plane (that is, when the center axis of the stylus 100 is not tilted against the coordinate input plane). Accordingly, when the stylus 100 is tilted against the coordinate input plane of the tablet 91, an error occurs in the coordinate by selecting the coordinate of the digital value corresponding to the voltage generated at the sense coils.

Further, when the output level of the alternating magnetic value is reduced due to exhaustion of a battery in the stylus 100, induction signals generated at the sense coils due to the alternating magnetic field having the reduced output level is detected and coordinates corresponding to an amplitude of the induction signals are selected, thereby reducing reading accuracy of the coordinates.

SUMMARY OF THE INVENTION

The invention provides a coordinate reading device that can precisely read coordinates of a coordinate input device even when the coordinate input device is tilted against a coordinate input area or when an output level of an alternating magnetic field generated from the coordinate input device is reduced.

In various embodiments, the coordinate reading device includes a coordinate input sheet that has a coordinate input area for inputting a coordinate by a coordinate input device generating an alternating magnetic field, and a plurality of loop coils laid under the coordinate input area; a coil detecting device that detects a coil that generates a maximum signal level and a coil that generates a first signal level that is a larger signal level generated from one of coils adjacent to the coil generating the maximum signal level, in accordance with a strength of the alternating magnetic field generated from the coordinate input device; a first storage device that stores a first relationship between the maximum signal level and the first signal level and a second relationship between the first relationship and a distance between a predetermined position and the coordinate input device on the coordinate input area; a reading controller that reads a distance, corresponding to the first relationship obtained based on the detected maximum signal level and the first signal level, from the first storage device, and reads a positional coordinate of the coordinate input device on the coordinate input area based on the read distance; a signal level detecting device that detects a second signal level in which two signal levels detected from coils adjacent to each other of the plurality of coils are substantially equal to each other, in accordance with the strength of the alternating magnetic field; a signal level calculating device that calculates a third relationship between a third signal level and a fourth signal level which are generated from at least two coils adjacent to the outside of the adjacent coils generating the second signal level detected by the signal level detecting device; a second storage device that stores relationships between the second signal level and the third relationship and a correction; and a correcting device that corrects the second relationship stored in the first storage device by reading the correction, corresponding to the second signal level detected by the signal level detecting device and the third relationship calculated by the signal level calculating device, from the second storage device.

The signal level detecting device detects a second signal level in which two signal levels detected from coils adjacent to each other of the plurality of coils are substantially equal to each other, in accordance with the strength of the alternating magnetic field.

That is, in the coordinate reading device that detects coordinates of the coordinate input device based on a difference between two signal levels detected from the adjacent coils of the plurality of coils, when the coordinate input device exists in a middle of two coils adjacent to each other, the difference of the two signal levels generated on the two coils is zero, that is, the two signal levels indicate the same value. This relationship is also established when a strength of the alternating magnetic field generated from the coordinate input device becomes weak or when the coordinate input device is tilted with respect to the coordinate input area.

Therefore, if the two signal levels are detected when the relationship is established, the strength of the alternating magnetic field can be obtained.

The signal level calculating device calculates a third relationship between a third signal level and a fourth signal level which are generated from at least two coils adjacent to the outside of the adjacent coils generating the second signal level detected the second signal level detecting device.

That is, when the coordinate input device is perpendicular to the coordinate input area (when the coordinate input device is not tilted against the coordinate input area), a relationship that the third signal level and the fourth signal level, which are generated from at least two coils adjacent to the outside of the adjacent coils generating the second signal level detected the second signal level detecting device, are the same, is established. However, when the coordinate input device is tilted against the coordinate input area, the third signal level and the fourth signal level indicate a different value, so that the relationship described above cannot be established.

The second storage device stores the relationships between the second signal level and the correction and between the third relationship and the correction.

That is, as the second signal level changes, the third relationship between the third signal level and the fourth signal level changes. Therefore, the second storage device stores the relationships between the second signal level and the correction and between the third relationship and the correction.

The correction device corrects the second relationship stored in the first storage device by reading the correction, corresponding to the second signal level detected by the signal level detecting device and the third relationship calculated by the signal level calculating device, from the second storage device.

That is, when the second signal level is detected, the correction device calculates the third relationship corresponding to the second signal level by the signal level calculating device, reads the correction corresponding to the calculated third relationship from the second storage device, and corrects the second relationship stored in the first storage device based on the read correction.

Thus, every time the second signal level is detected, the second relationship stored in the first storage device can be corrected. Accordingly, the coordinate reading device can be provided that can precisely read coordinates of a position of the coordinate input device even when the coordinate input device is tilted against the coordinate input area or when an output level of the alternating magnetic field generated from the coordinate input device is reduced.

According to one exemplary aspect of the invention, the correction stored in the second storage device may be an amount of linear changes in the first relationship and the distance which are obtained in advance by measurement when a center axis of the coordinate input device is tilted against the coordinate input area from a state where the coordinate input device is perpendicular to the coordinate input area.

That is, the second relationship for obtaining the coordinates of the coordinate input device is a relationship between the first relationship and the distance between the predetermined position and the coordinate input device on the coordinate input area. The second relationship can be expressed by a substantially linear relationship. Thus, it can be regarded that the second relationship when the center axis of the coordinate input device is tilted from the state where the coordinate input device is perpendicular to the coordinate input area substantially linearly changes.

Accordingly, a linear correction of the coordinate can be performed by storing the amount of linear changes obtained in advance by measurement, as a correction, in the second storage device. Therefore, the coordinate reading device can precisely read the coordinates of the coordinate input device even when the coordinate input device is tilted against the coordinate input area or when the output level of the alternating magnetic field generated from the coordinated input device is reduced.

According to another exemplary aspect of the invention, the correction stored in the second storage device may be an expression that establishes the relationship between the first relationship and the distance when the center axis of the coordinate input device is tilted against the coordinate input area from a state where the coordinate input device is perpendicular to the coordinate input area, by the second signal level and the third relationship obtained in advance by the measurement.

That is, the second relationship for obtaining the coordinates of the coordinate input device, for example, can be expressed by an expression formed by the second signal level and the third relationship.

Therefore, a correction of the coordinate can be performed by storing the expression when the center axis of the coordinate input device is tilted against the coordinate input area from a state where the coordinate input device is perpendicular to the coordinate input area, as a correction, in the second storage device. Therefore, the coordinate reading device can precisely read the coordinates of the coordinate input device even when the coordinate input device is tilted against the coordinate input area or when the output level of the alternating magnetic field generated from the coordinated input device is reduced.

According to another exemplary aspect of the invention, the coordinate input device may include a power supply therein, and the second storage device may store relationships between the second signal level, the third relationship and voltage of the power supply and the correction when the center axis of the coordinate input device is tilted against the coordinate input area from a state where the coordinate input device is perpendicular to the coordinate input area. The coordinate reading device may further include a warning device that warns of exhaustion of the power supply when the voltage of the power supply, which is read from the second storage device and corresponding to the second signal level detected by the second signal level detecting device and the third relationship calculated by the signal level calculating device, is lower than a predetermined valve.

That is, as the voltage of the power supply built in the coordinate input device decrease, the strength of the alternating magnetic field generated from the coordinate input device becomes weak. Thus, the second signal level decreases and the third relationship changes.

The second storage device stores the second signal level and relationships between the third relationship and voltage of the power supply and between the third relationship and the correction when the center axis of the coordinate input device is tilted against the coordinate input area from a state where the coordinate input device is perpendicular to the coordinate input area. Accordingly, when the second signal is detected, the warning device can warn of exhaustion of the power supply when the voltage of the power supply is lower than the predetermined voltage, by reading the second signal level detected by the second signal level detecting device and the voltage of the power supply corresponding to the third relationship calculated by the signal level calculating device.

BRIEF DESCRIPTION OF THE DRAWINGS

Embodiments of the invention will be described in detail with reference to the following figures, wherein:

FIG. 6A illustrates a part of the coils C(n) to C(n+3);

FIG. 6B shows digital values, into which values of voltages generated on the coils C(n) to C(n+3) are converted (RSSI (Received Signal Strength Indicator)), relative to a position of the stylus in a width direction of the X-coil;

FIG. 6C is a plot of the voltage difference between the adjacent two coils among the coils C(n) to C(n+3) (diff), relative to the position of a stylus in the width direction of the X-coil;

FIG. 14 is a table showing a measurement result of Dp, Vc, and S when the tilt angle and the battery voltage of the stylus is changed;

FIG. 25 is a plot comparing an actual battery voltage and a detected battery voltage of the stylus each when the tilt angle of the stylus is 0, 10, 20, and 30 degrees;

DETAILED DESCRIPTION OF THE PREFERRED EMBODIMENTS

An embodiment of a coordinate reading device according to the invention will be described with reference to the accompanying drawings. For illustrative purposes, an explanation will be given of an electric whiteboard that electrically reads images drawn by a stylus on an input panel and stores data of the read images therein.

Figure 1:
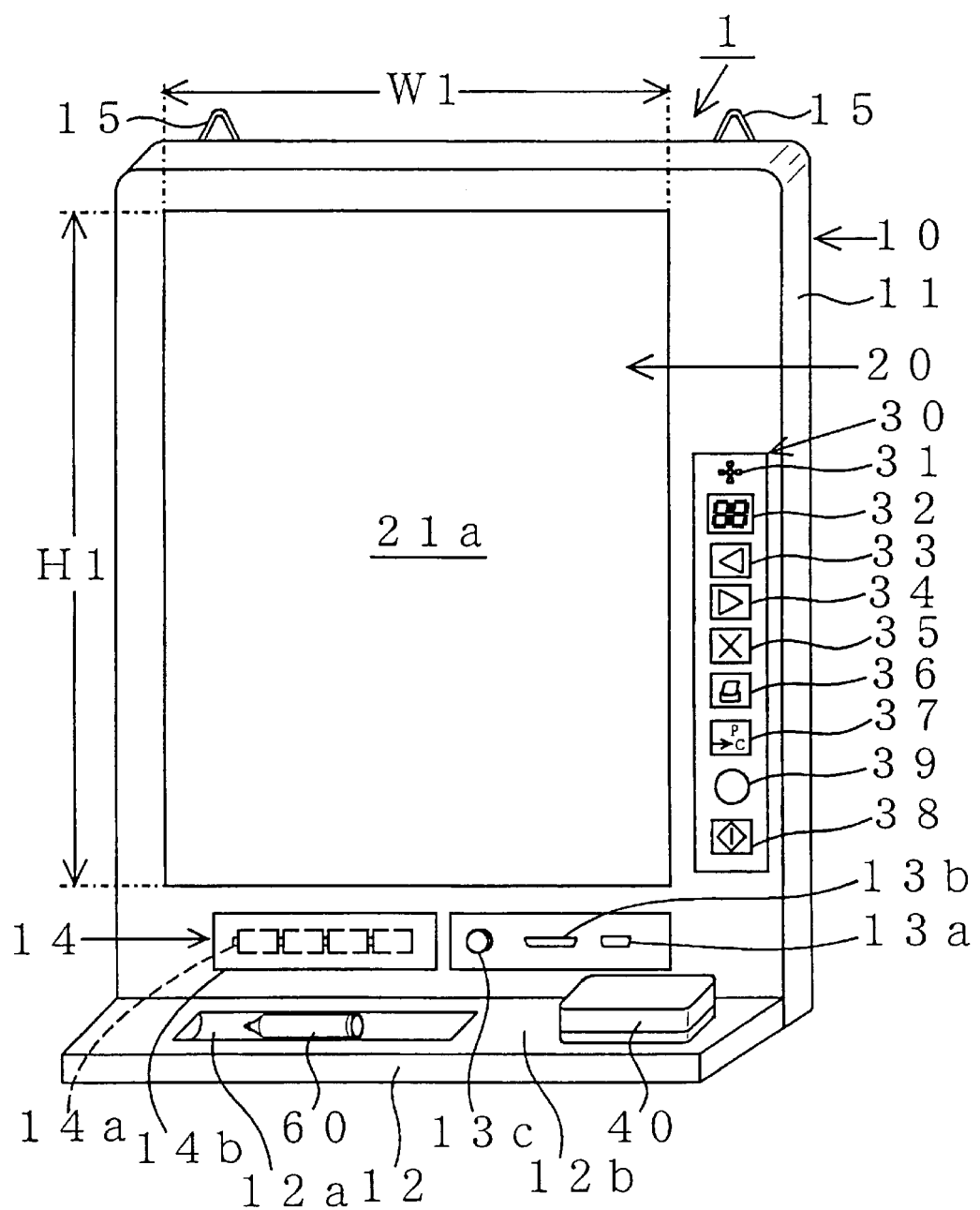
FIG. 1 is a perspective view showing a main structure of an electronic whiteboard according to an embodiment of the invention.
Figure 2:
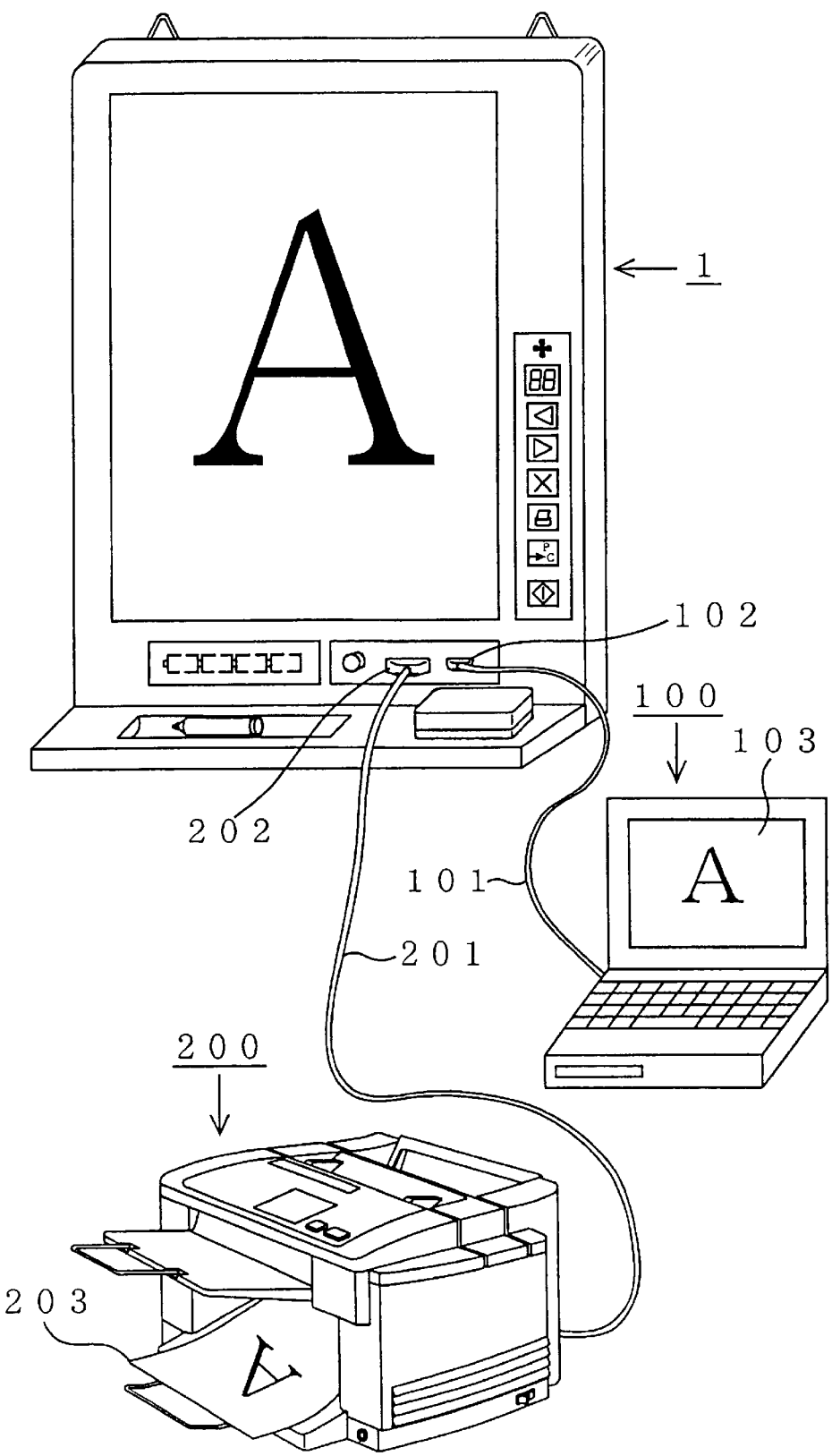
FIG. 2 is an explanatory view showing the electronic whiteboard shown in FIG. 1 with a personal computer and a printer connected.

First, a main structure of the electronic whiteboard according to the first embodiment will be described with reference to FIGS. 1 and 2. FIG. 1 is a perspective view showing the main structure of the electric whiteboard. FIG. 2 illustrates the electric whiteboard connected to a personal computer (hereinafter referred to as PC) and to a printer.

The electric whiteboard 1 includes an input panel 10 having an input plane 21a, a stylus 60 for inputting images, such as characters and drawings, on an input plane 21a (inputting coordinates) and for allowing the electric whiteboard 1 to read and store data indicative of the images (hereinafter referred to as input data), and an eraser 40 for deleting the images input by the stylus 60 and the input data. The input panel 10 is provided with a frame 11, in which an input panel body 20 is installed. The frame 11 is provided with a flat tray 12 along its lower end to protrude forward. The tray 12 has a dent 12a in which the stylus 60 is placed, and a flat portion 12b on which the eraser 40 is placed. The stylus 60 has the same structure as a conventional stylus, so that detailed descriptions for the stylus 60 will be omitted.

The frame 11 includes, on its front right side, an operating portion 30 that has a speaker 31, an LED page number display 32, a page back button 33, a page feed button 34, a delete button 35, a print button 36, a PC output button 37, a power button 38 and an LED battery display 39. The speaker 31 reproduces various sounds (such as a warning beep and an operating sound). The page number display LED 32 is constructed of a seven-segmented LED and indicates the number of pages where the input data on the input plane 21a is stored in the electric whiteboard 1. The page back button 33 and the page feed button 34 are for paging up and down by a page at the push thereof, respectively. The delete button 35 is for erasing one page's worth of the input data at the push thereof. The print button 36 and the PC output button 37 are for outputting the input data to a printer 200 and to a PC 100 (FIG. 2), respectively, at the push thereof. The power button 38 is for energizing and de-energizing the electric whiteboard 1. The LED battery display 39 indicates battery exhaustion of the stylus 60.

A battery case 14 is provided at the lower portion on the front surface of the frame 11. The battery case 14 is provided with a lid 14b in the frame 11 for housing, therein, four C batteries 14a to be used as a power source of the electric whiteboard 1. The lid 14b is openably and closably attached to the front surface of the battery case 14. On the right of the battery case 14, a volume controller 13c adjusts the volume of the speaker 31. Further, connectors 13a and 13b are used to connect the electric whiteboard 1 to the PC 100 and to the printer 200 with plugs 102, 202, via connector cables 101, 201, respectively, as shown in FIG. 2.

The input data may be output to the PC 100 to be read on a monitor 103, or may be output to the printer 200 to be printed on a paper 203.

Two pieces of mounting hardware 15 are attached to the top end of the frame 11 for hanging the electric whiteboard 1 on a wall.

In this embodiment, the input plane 21a is 600 nm wide (W1) and 900 mm long (H1). The frame 11 and the tray 12 are made of a synthetic resin, such as polypropylene (PP). Thus, the electric whiteboard 1 is lightweight with a total weight of 10 kg or less.

Figure 3:
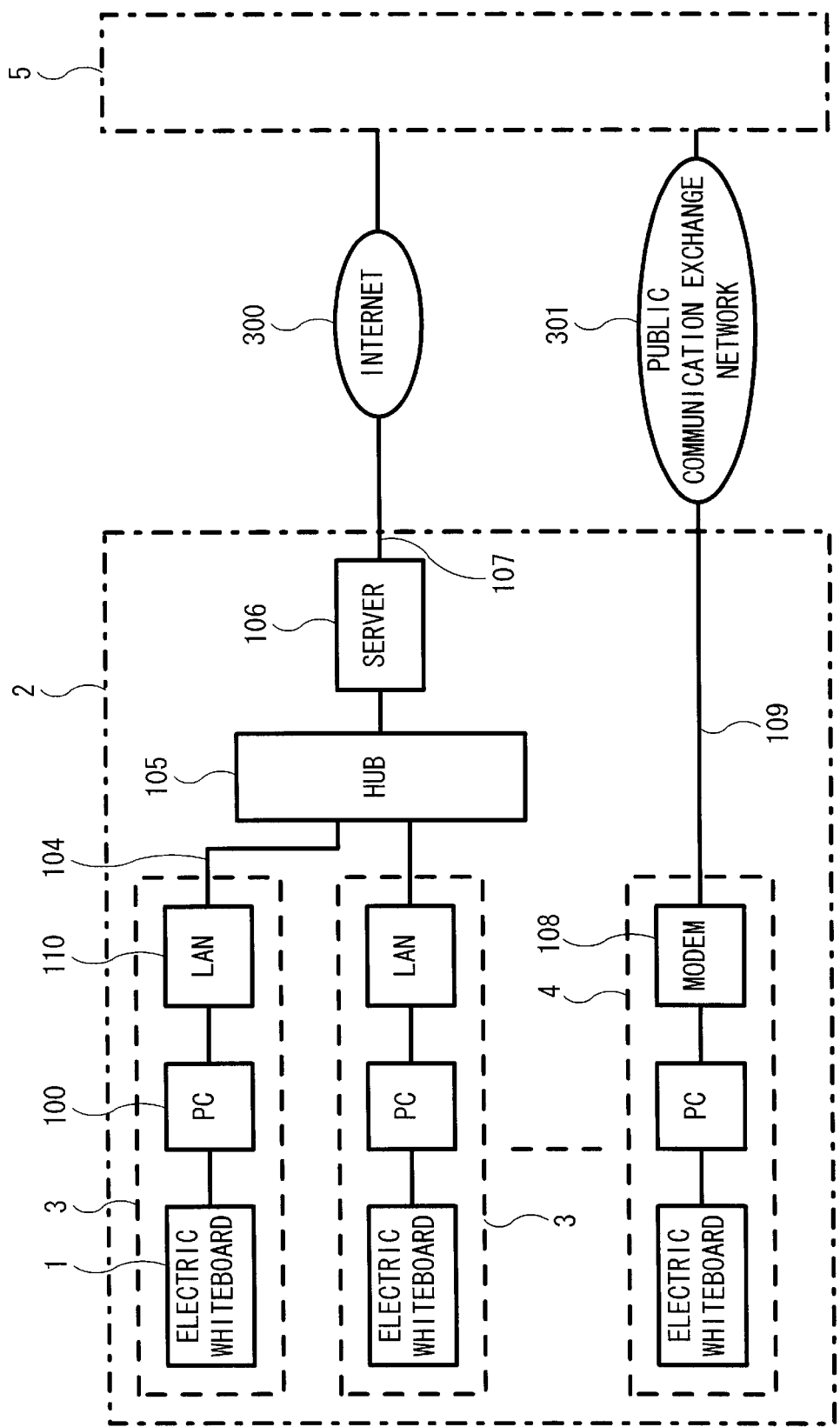
FIG. 3 is a block diagram of a network of the electronic whiteboard for data communication.

FIG. 3 is a block diagram of a network constructed for a plurality of electric whiteboards 1.

As illustrated in FIG. 3, data communication can be performed within the network of electric whiteboards. Herein, the data communication is performed between rooms in a company, or between companies within the network of the electric whiteboards. However, it should be appreciated that any network can be used to connect a plurality of electric whiteboards.

Each of the rooms 3 in a company 2 is equipped with the electric whiteboard 1, the PC 100 connected with the electric whiteboard 1, and a LAN board 110 connected with the PC 100, respectively. Each of the LAN boards 103 is connected to a HUB 105 with a LAN cable 104. The HUB 105 is further connected to a server 106 capable of accessing to another company 5 via Internet 300 through a cable 107. Another room 4 in the company 2 is equipped with an electric whiteboard 1, a PC 100 connected with the electric whiteboard 1, and a modem 108, connected with the PC 100, capable of accessing to the company 5 through telephone line 109 via a public communication exchange network 301. The company 5, as well as the company 2, has an electric whiteboard 1 capable of communicating through a PC 100, although not shown in FIG. 3.

Data communication can be performed within the network of the electric whiteboards. For example, the input data stored in the electric whiteboard 1 can be transmitted from the corresponding PC 100 to another PC 100 through the corresponding LAN boards 110 and the HUB 105. The data may be displayed on the monitor 103 provided to the PC 100, or may be output to the printer 200 to print the data on the paper 203 (FIG. 2).

The input data can also be transmitted to the company 5 via Internet 300, attached to an e-mail as an image file formatted in TIFF (Tag Image File Format). The image file is decoded in the company 5 to read the transmitted data.

Figure 4:
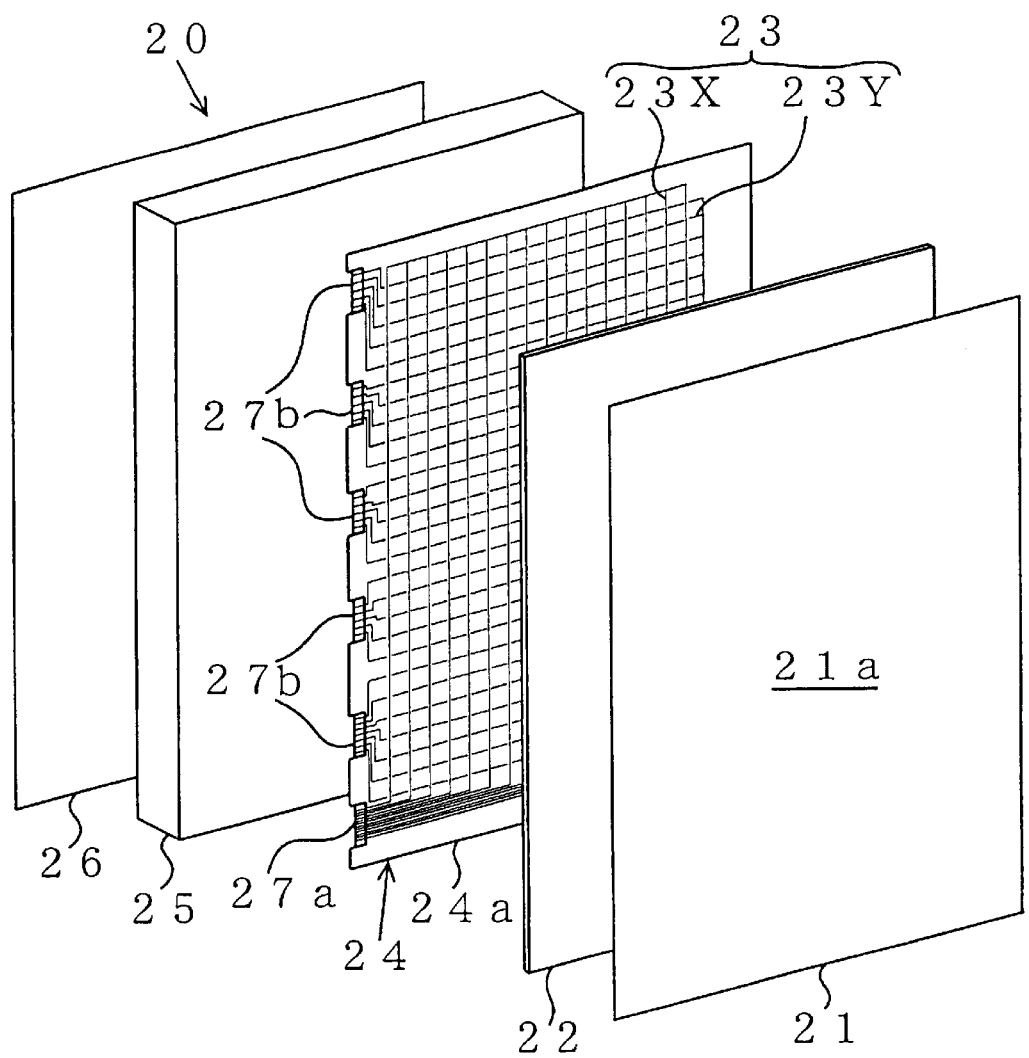
FIG. 4 is an exploded perspective view showing components of an input panel body provided within the electronic whiteboard.

A structure of the input panel body 20 will be described below with reference to FIG. 4. FIG. 4 is an exploded view of the input panel body 20.

The input panel body 20 includes an input sheet 21 having the input plane 21a, a plate-shaped front panel 22, a coordinate input sheet 24 provided with coils 23 including a plurality of loop coils (including X-coils and Y-coils), a plate-shaped support panel 25, and a plate-shaped back panel 26. They are laminated together in this order, as shown in FIG. 4.

Figure 5A:
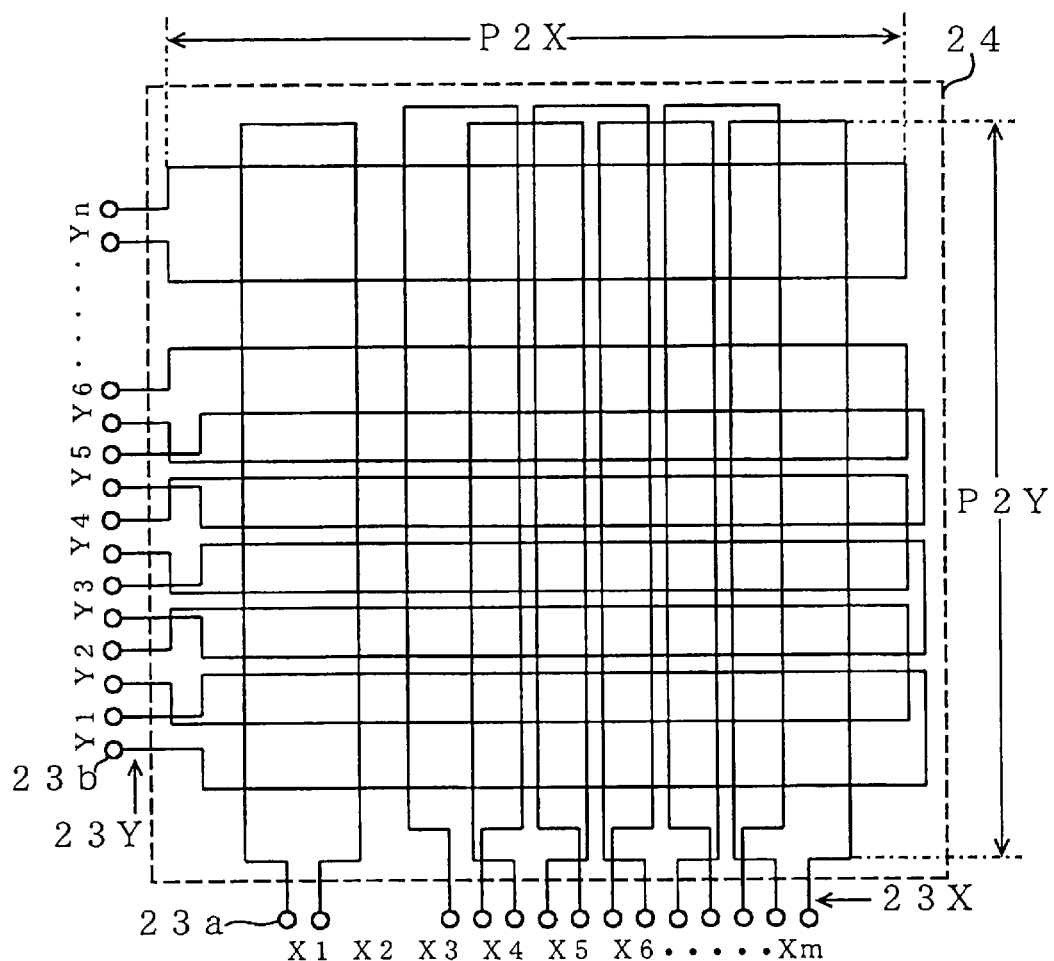
FIG. 5A illustrates how coils are arranged on a coordinate input sheet, while omitting a part of the coils.
Figure 7:
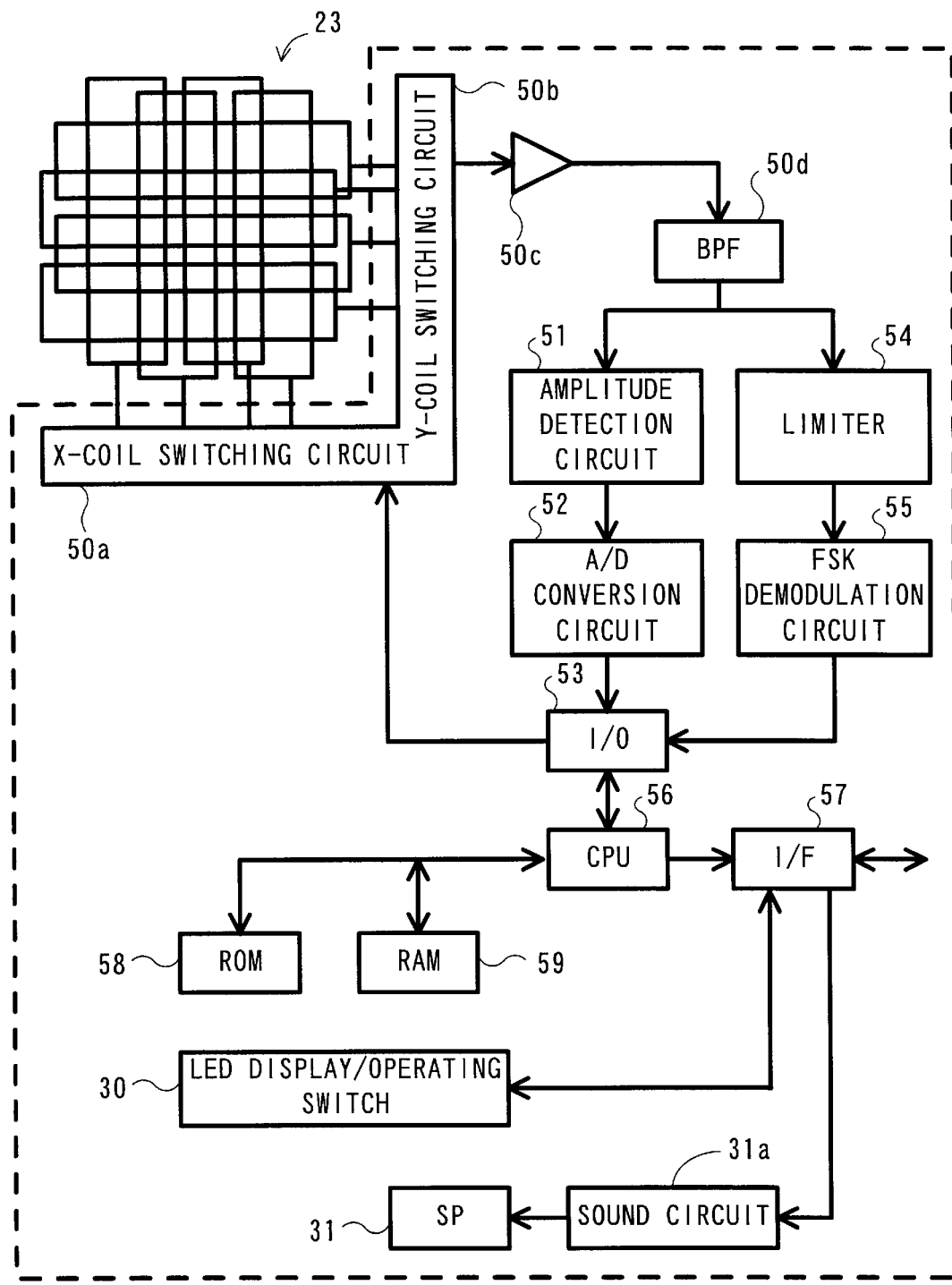
FIG. 7 is a block diagram showing an electrical structure of the electronic whiteboard.

The coils 23X arranged in an X-coordinate direction (hereinafter referred to as X-coils) and the coils 23Y arranged in a Y-coordinate direction (hereinafter referred to as Y-coils) are printed on a sheet body 24a using a conductive material. At the left edge of the sheet body 24a, terminal gathered portions 27b, in each of which a plurality of terminals 23b of the Y-coils 23Y are gathered, and a terminal gathered portion 27a, in which a plurality of terminals 23a of the X-coils 23X are gathered, is formed (FIG. 5A). The terminal gathered portion 27a and 27b are electrically connected to an X-coil switching circuit 50a and a Y-coil switching circuit 50b, respectively, via connectors (not shown) (FIG. 7).

In this embodiment, the input sheet 21 is formed of polyethylene terephthalate (PET) films which are laminated into a thickness of 0.1 mm. The front panel 22 is made of, for example, acrylic resin, acrylonitrile-butadiene-styrene resin (ABS), or polycarbonate (PC), to be 3.0 $\mu$m thick. The sheet body 24a of the coordinate input sheet 24 is made of, for example, PET and polyimide, to be 30 $\mu$m to 1 mm thick, since PET and polyimide are easily processed and have high durability. The support panel 25 is made of foam, such as styrofoam, to be 40 mm thick. The back panel 26 is made of a conductive material, such as aluminum, to be 1.0 mm thick.

Figure 5B:
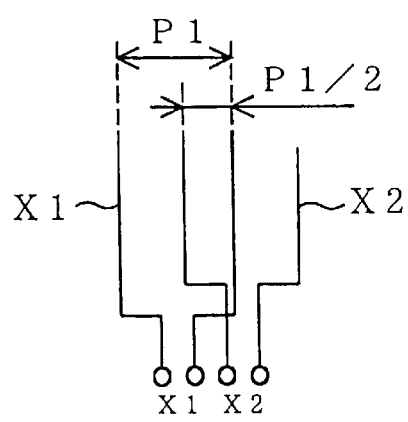
FIG. 5B shows a width of the coil and an overlapping pitch between the coils.

FIG. 5A illustrates how the coils 23, shown in FIG. 4, are arranged on the coordinate input sheet 24, and FIG. 5B shows a width of the coil 23 and an overlapping pitch between the coils 23.

As shown in FIG. 5A, the Xi-coils (i=1, 2, 3 ..., m) are arranged in an X-coordinate direction for sensing X-coordinates of the stylus 60 and the eraser 40. The Yi-coils (i=1, 2, 3 ..., n) are arranged in an Y-coordinate direction that is orthogonal to the X-coordinate direction for sensing Y-coordinates of the stylus 60 and the eraser 40. Each of the X- and Y-coils is loop-shaped, in a generally rectangular shape with a length (a longitudinal side of the rectangle) P2X or P2Y.

As shown in FIG. 5B, the X-coils, each having a width P1 (a short side of the rectangle), overlap one another with a pitch P1/2 (half the width P1). In the same way, the Y-coils, each having a width P1, overlap one another with a pitch P1/2. Each X- and Y-coil has a pair of terminals 23a, 23b connected to the terminal gathered portions 27a and 27b, respectively (FIG. 4).

In this embodiment, there are provided 22 X-coils (m=22) and 33 Y-coils (n=33). The width P1 and the lengths P2X and P2Y are 50 mm, 680 mm and 980 mm, respectively (P1=50 mm, P2X=680 mm, P2Y=980 mm). Both of the X- and Y-coils are printed on the coordinate input sheet 24 using copper, silver or carbon pastes to be 6 to 10 $\mu$m thick (for example, screen printing).

Herein, the coils are drawn in FIG. 5A for clarity and simplicity, so that the sides of the X- and Y-coils are shifted from one another. In practice, the longitudinal side of the X-coil X1, for example, overlaps the short sides of the Y-coils Y1, Y2, Y3, ..., Yn. Further, each pair of the terminals 23a, 23b are formed to have a minimal space therebetween.

FIG. 6A is a partial view of the coils C(n), C(n+1), C(n+2) and C(n+3). FIG. 6B shows digital values, into which values of voltages generated on the coils C(n) to C(n+3) are converted (hereinafter referred to as RSSI (Received Signal Strength Indicator)), relative to a position of the stylus 60 in a width direction of the X-coil. FIG. 6C is a plot of the voltage difference between the adjacent two coils among the coils C(n) to C(n+3) (diff), relative to the position of the stylus 60 in the width direction of the X-coil.

Center lines of the coils C(n), C(n+1), C(n+2) and C(n+3) are referred to as Q(n), Q(n+1), Q(n+2) and Q(n+3), respectively, as shown in FIG. 6A. Each RSSI of the coils indicates a single-peaked pattern, being maximum on the center lines Q(n), Q(n+1), Q(n+2) and Q(n+3) and becoming smaller beyond the center lines. An overlapping pitch is P1/2 so that the RSSI has null points beyond the center lines of the adjacent coils.

Herein, the width P1 may be broadened as long as the RSSI indicates a single-peaked pattern. The overlapping pitch may be lessened less than P1/2 as long as the RSSI has the null points beyond the center lines of the adjacent coils. This allows the electric whiteboard 1 to read coordinates of the stylus 60 over a broad area of the input plane 21a with a lower number of coils.

As shown in FIG. 6C, the voltage differences diff between the adjacent two coils are respectively at the maximum on the center lines Q(n), Q(n+1), Q(n+2) and Q(n+3), and are respectively zero at the midpoint between the center lines of the adjacent coils. The midpoint corresponds to a point located at a midpoint of the overlapping area between the longitudinal sides of the adjacent two coils.

It assumed that the stylus 60 is located at a point Q1, the RSSI of the coil C(n) is V1, and the RSSI of the coil C(n+1) is V2. A distance $\Delta$ Q1 between the center line Q(n+1) and the point Q1 can be detected by obtaining the voltage difference diff (V2−V1). Thus, a position of the point Q1 can be obtained. The relationship shown in FIG. 6C is tabled to calculate coordinates and is stored in a ROM 58 (FIG. 7) as a position resolving table (hereinafter referred to as PRT).

As shown in FIG. 7, a CPU 56 controls the X-coil switching circuit 50a, via an input/output (I/O) circuit 53, to scan the X-coils. At that time, an alternating magnetic field from the stylus 60 placed on the input plane 21a (FIG. 1) forms magnetic coupling with the X-coils, thereby generating signals. The signals are amplified by an amplifier 50c, and the amplified signals are filtered by a band-pass filter (BPF) 50d for extracting the frequency band of the alternating magnetic field from the X-coils from the frequency band of the amplified signals. The signals filtered by the BPF 50d are detected by an amplitude detection circuit 51, and the detected signal are converted by an A/D converter 52 into digital signals in correspondence with the amplitude of the signals, that is, voltage. These digital signals are input into the CPU 56 via the I/O circuit 53.

Upon the input of the digital signals into the CPU 56, the CPU 56 stores detected values indicating digital signals in a temporary storage area of a RAM 59 with respect to the corresponding coil numbers of the X-coils. Then, the CPU 56 selects a maximum detection value from the stored values and a detection value that is a larger value selected from detection values of the X-coils located on both sides of the X-coil of the maximum value. After that, an X-coordinate is calculated using the detection values, the PRT, and a corrective coefficient. This calculation method will be described later.

The signal that has passed the BPF 50d is formed into a square wave pulse by a limiter circuit 54, and is frequency-shift-keying (FSK) demodulated by an FSK demodulation circuit 55. Then, the output value of the FSK demodulation circuit 55, indicative of the demodulation result, is output to the CPU 56 via the I/O circuit 53. The CPU 56 detects an attribute of the stylus 60 based on the output value of the FSK demodulation circuit 55.

For example, when the output value from the FSK demodulation circuit 55 is 245, the CPU 56 determines that the stylus 60 includes black ink.

The CPU 56 is connected with the ROM 58 that stores various programs for executing the calculation of coordinates, the correction of the PRT, and the PRT, and an interface circuit 57. The interface circuit 57 is connected with the operating portion 30 and a sound circuit 31a for generating sounds from the speaker 31. A fundamental structure of the electric whiteboard 1 is realized in similar structures disclosed in U.S. Pat. No. 5,136,125, commonly owned U.S. patent application Ser. Nos. 09/628,724, 09/634,322, 09/636,818, 09/659,754, 09/666,892, and Japanese Laid-Open Patent Publication No. 05-165560, the disclosures of which are herein incorporated by reference.

The correction of positional coordinates of the stylus 60 on the input plate 21a will be described below.

The above-described method for obtaining the positional coordinate is implemented, assuming that a center axis of the stylus 60 is perpendicular to the input plane 21a, that is, the stylus 60 is not tilted against the input plane 21a, and a voltage of a battery in the stylus 60 does not decrease.

However, if the center axis of the stylus 60 is tilted with respect to the input plane 21a, a distribution of the alternating magnetic field generated from the stylus 60 becomes nonuniform. As a result, an error occurs between the positional coordinate obtained by the above-described method and an actual positional coordinate of the stylus 60. When the voltage of the battery in the stylus 60 decreases, the strength of the alternating magnetic field generated from the stylus 60 becomes weak, thereby causing the error.

Accordingly, a linear correction and a dynamic correction are conceived to correct the error to increase reading accuracy of the positional coordinate.

Figure 8:
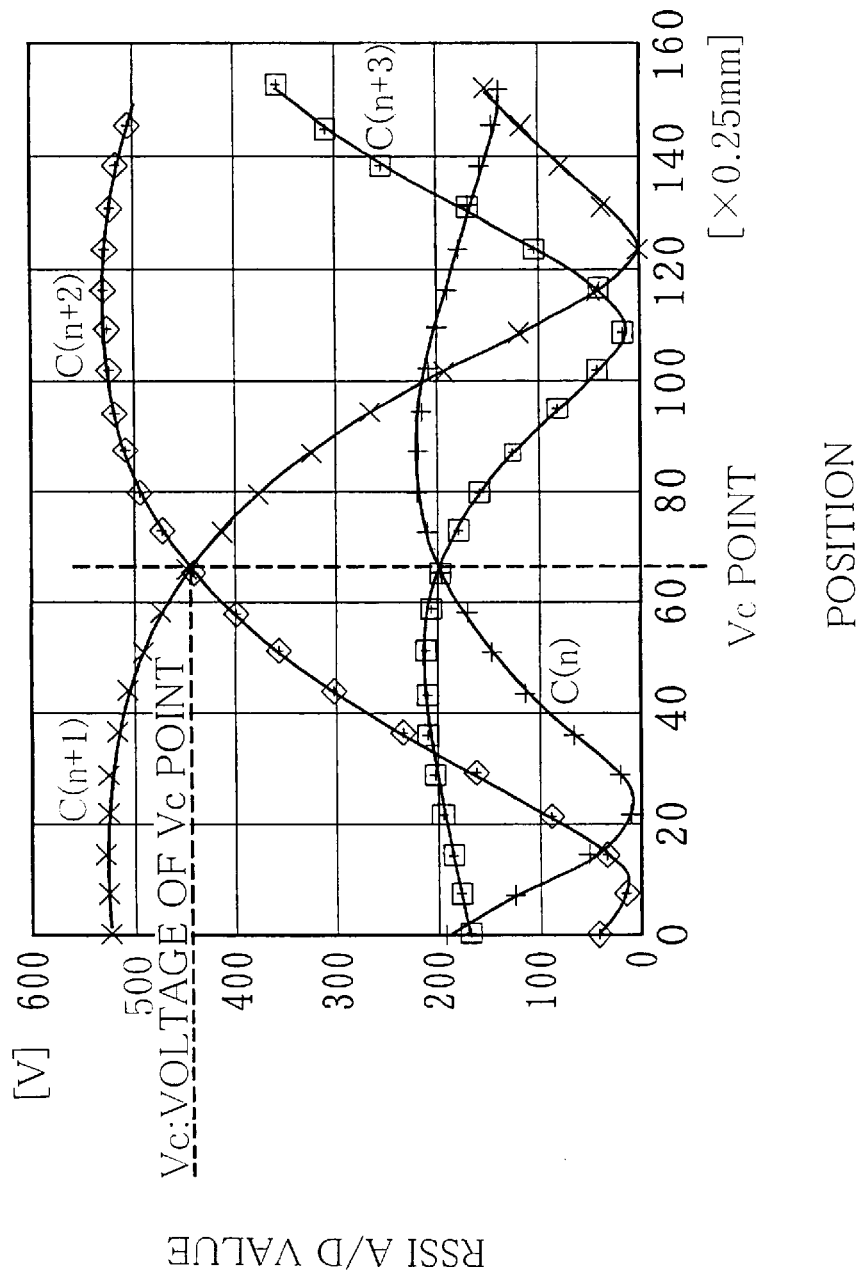
FIG. 8 is a graph showing a portion where the RSSIs of the coil C(n+1) and C(n+2), which are adjacent to each other, at a first peak, are equivalent, when the stylus is perpendicular to an input plane.
Figure 9:
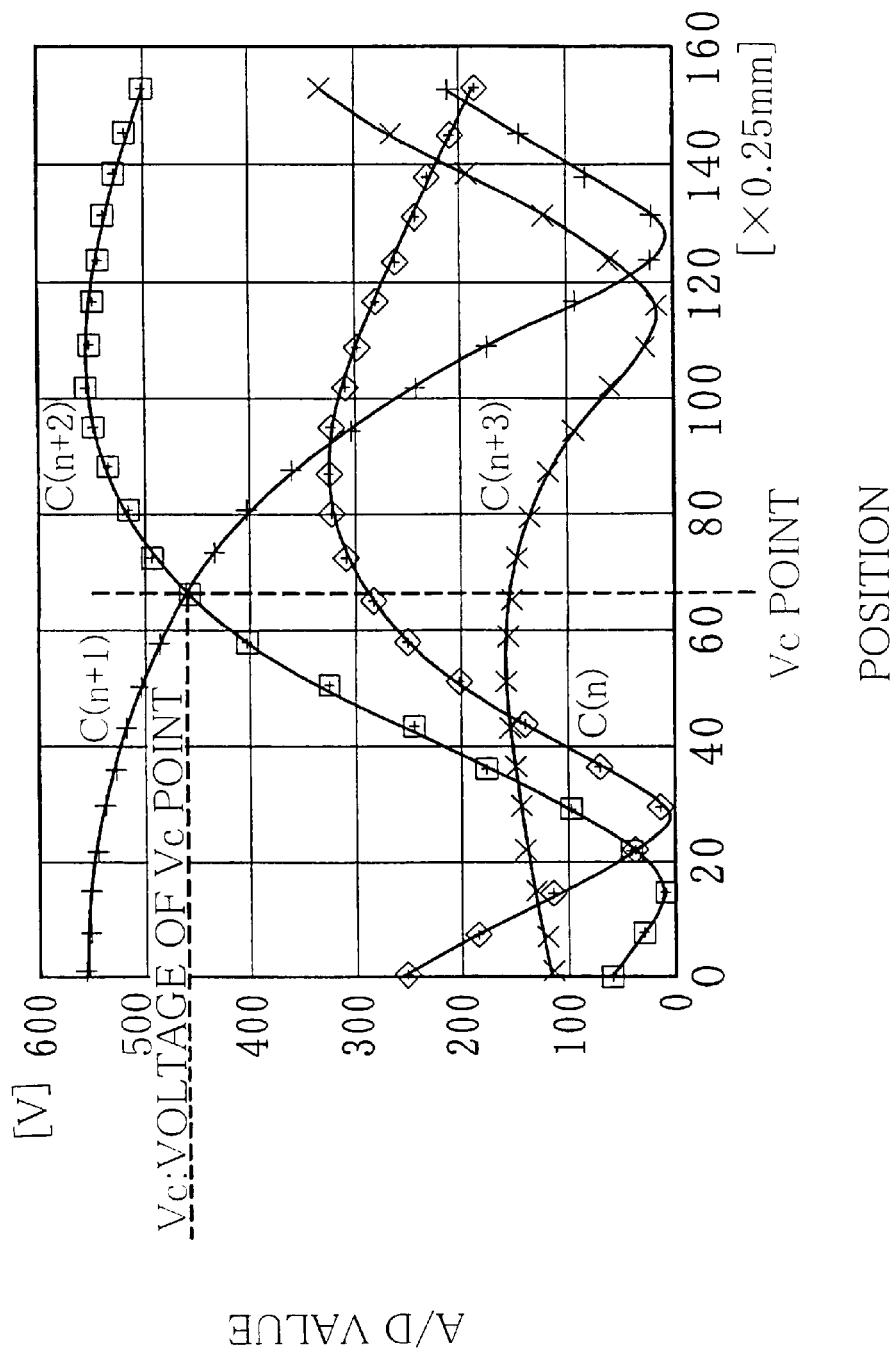
FIG. 9 is a graph showing a portion where the RSSIs of the coil C(n+1) and C(n+2), which are adjacent to each other, at the first peak, are equivalent, when the stylus is tilted against the input plane.

First, the linear correction will be described. FIGS. 8 and 9 show the RSSIs of the coils C(n) to C(n+3), relative to a position of the stylus 60. FIG. 8 is a graph showing a portion where the RSSIs of the coil C(n+1) and C(n+2), which are adjacent to each other, at a first peak, are equivalent, when the stylus 60 is perpendicular to the input plane 21a. FIG. 9 is a graph showing a portion where the RSSIs of the coil C(n+1) and C(n+2), which are adjacent to each other, at the first peak, are equivalent, when the stylus 60 is tilted against the input plane 21a.

As shown in FIG. 8, the RSSI of the coil C(n), adjacent to the coil C(n+1), at a second peak, is equivalent to the RSSI of the coil C(n+3), adjacent to the coil C(n+2), at the second peak. The RSSI of the coil C(n) and the RSSI of the coil C(n+3) are referred to as RSSI(C(n)) and RSSI(C(n+3)), respectively. Thus the following expression is established.

$$Rs=RSSI(C(n))/RSSI(C(n+3))=1 \ldots \quad (1)$$

The parameter Rs is a ratio between the RSSIs of the coils adjacent to the coil having the maximum RSSI.

On the other hand, in FIG. 9, the RSSI of the coil C(n) at the second peak is greater than the RSSI of the coil C(n+3) at the second peak. Therefore, the following expression (2) is established.

$$Rs=RSSI(C(n))/RSSI(C(n+3))>1 \quad (2)$$

The value of Rs varies depending on the tilt angle of the stylus 60. Accordingly, taking note of this, correlation between the tilt angle of the stylus 60 and Rs and between the tilt angle and Vc are obtained. The obtained correlation is used for correcting a position.

Figure 10:
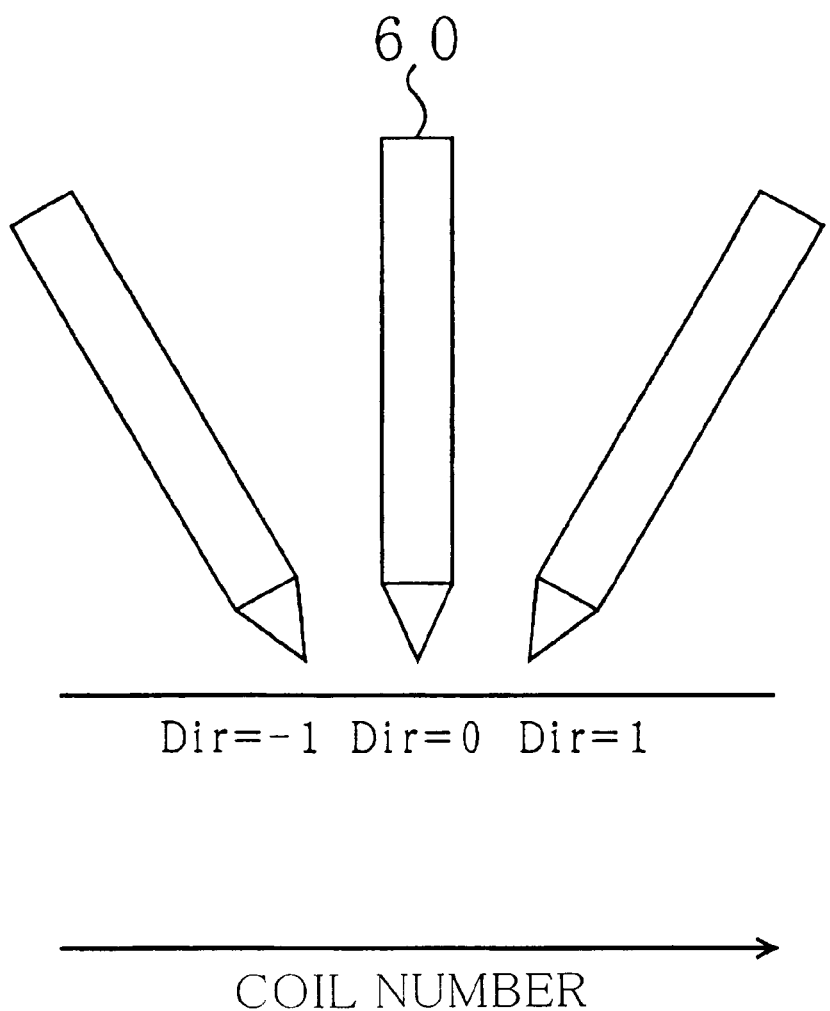
FIG. 10 is an explanatory diagram showing a tilt direction of the stylus.

Hereinafter, a position where the RSSIs of the coils, adjacent to each other, at the first peak, are equivalent is referred to as a Vc Point, and the RSSI of the coil at the Vc Point is referred to as Vc. FIG. 10 is an explanatory diagram showing a tilt direction of the stylus 60. As shown in FIG. 10, when the stylus 60 is perpendicular to the input plane 21a, a tilt direction Dir is set to 0 (Dir=0). When the stylus 60 is titled in a direction of increasing the coil number, the tilt direction Dir is set to 1 (Dir=1). When the stylus 60 is tilted in a direction of decreasing the coil number, the tilt direction Dir is set to −1 (Dir=−1).

An experiment was implemented to determine how the PRT changes in accordance with the changes of the tilt angle and the battery voltage of the stylus 60. In this experiment, a board on which coils are arranged in 25 mm (P1/2) pitch is used. While the stylus 60 is moved on the board with 0.25 mm pitch, RSSIs are measured to obtain voltage differences diff. Approximately 150 pieces of data were obtained. In the experiment, a total moving amount of the stylus 60 is 35.7 mm, which is larger than the coil arrangement pitch (25 mm). The experimental results are shown in FIGS. 11 and 12.

Figure 11:
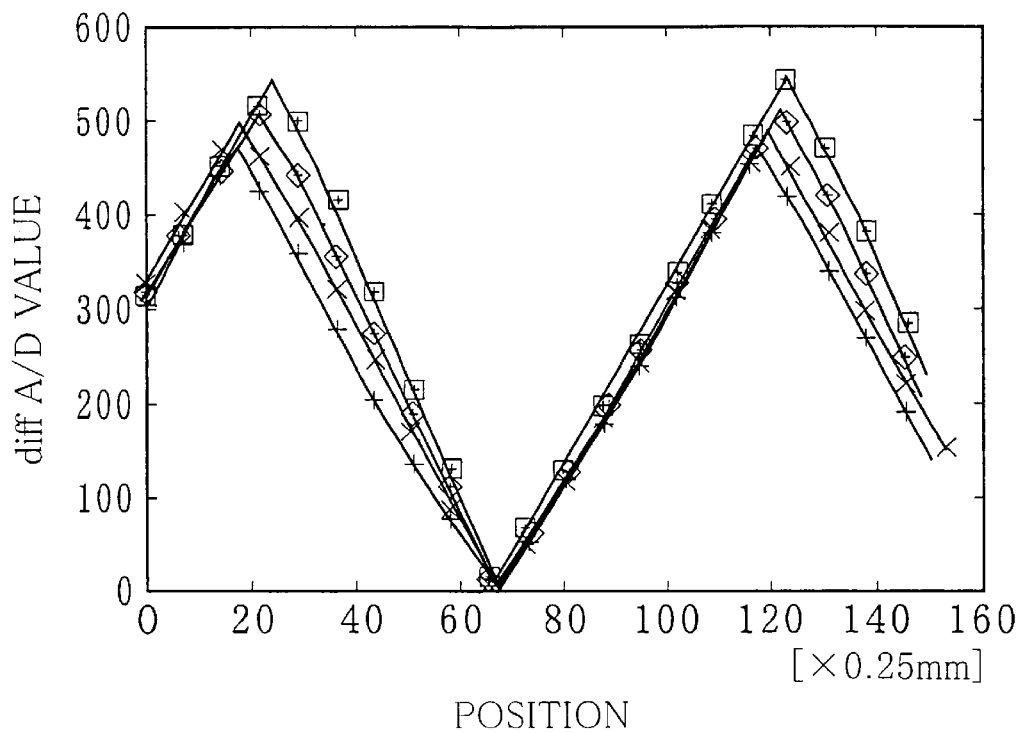
FIG. 11 is a graph showing four relationships, each between the voltage difference diff and the position of the stylus, at the time when the center axis of the stylus is tilted 0, 10, 20, or 30 degrees with respect to the input plane when the voltage of the battery in the stylus is constantly 1.5 V.

FIG. 11 is a graph showing four relationships each between the voltage difference diff and the position of the stylus 60, at the time when the center axis of the stylus 60 is tilted 0, 10, 20, or 30 degrees with respect to the input plane 21a when the voltage of the battery in the stylus 60 is constantly 1.5 V. FIG. 12 is a graph showing four relationships, each between the voltage difference diff and the position of the stylus 60, at the time when the voltage of the battery in the stylus 60 is 1.3 V, 1.4 V, or 1.5 V when the center axis of the stylus 60 is perpendicular to the input plane 21a (the tilt angel of the stylus 60 is 0 degree).

Figure 12:
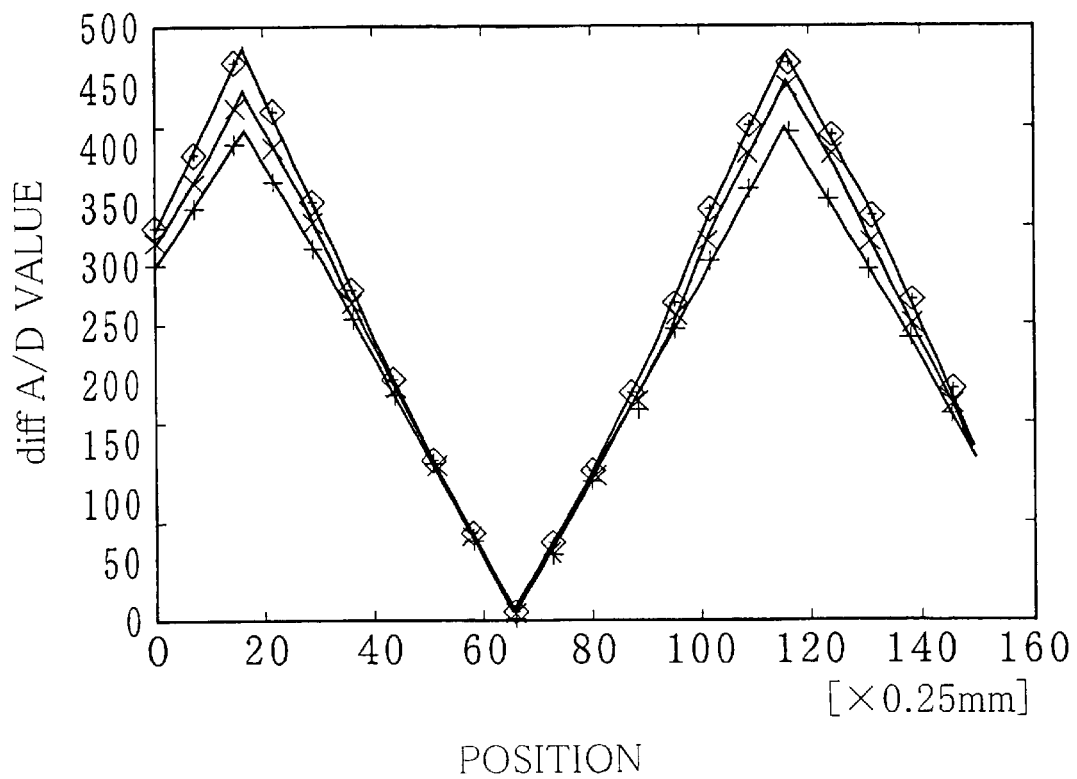
FIG. 12 is a graph showing four relationships, each between the voltage difference diff and the position of the stylus, at the time when the voltage of the battery in the stylus is 1.3 V, 1.4 V, or 1.5 V when the center axis of the stylus is perpendicular to the input plane (the tilt angel of the stylus 60 is 0 degree)

As shown in FIGS. 11 and 12, in accordance with the changes of the tilt angle and the battery voltage of the stylus 60, a vertex of a triangle formed with a pair of PRTs (two plotted adjacent PRTs) shifts in directions of the vertical axis and the lateral axis, though a base of the triangle does not change.

That is, it can be regarded that each point in the PRTs shifts relative to the shift of the vertex in the pair of PRTs. Therefore, with an application of the PRT, in which the amount of shift in the vertical axis and the lateral axis directions of the vertex of the pair of PRTs is proportioned to each point of the PRT, the correction of the position can be performed in accordance with the changes of the tilt angle and the battery voltage of the stylus 60. This is a principle of the linear correction.

Figure 13:
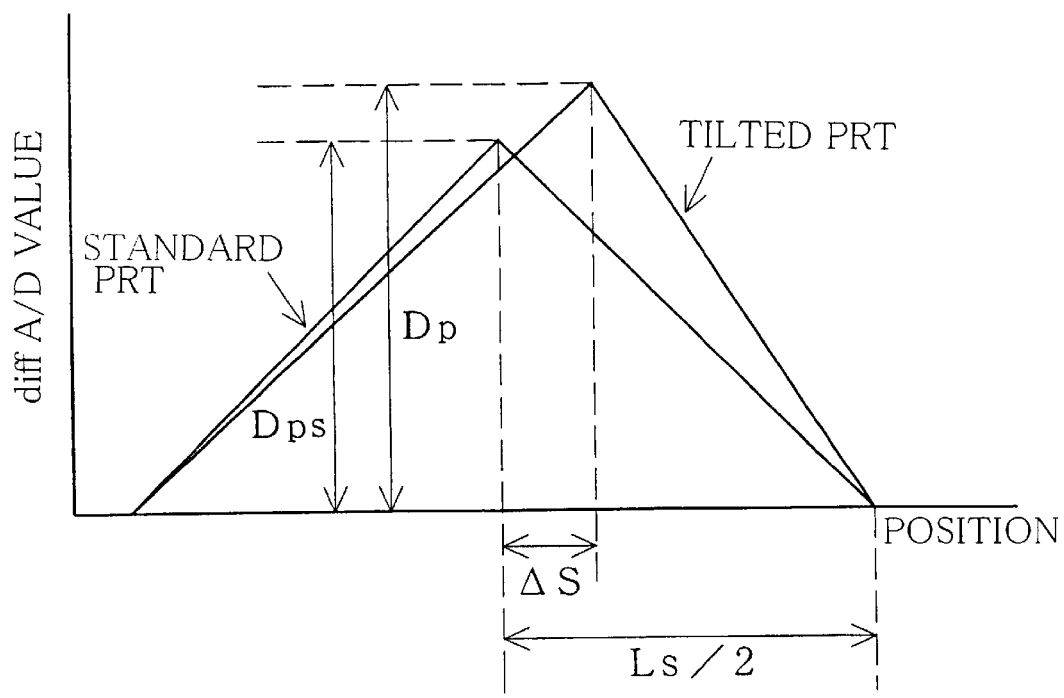
FIG. 13 illustrates a principal of a linear correction.

FIG. 13 shows the principle of the linear correction. In FIG. 13, a standard PRT shows a PRT when the tilt angle of the stylus 60 is 0 degree and the battery voltage is not decreased. A tilted PRT shows a PRT when at least one of the tilt angle or the battery voltage of the stylus 60 is changed, that is, when the stylus 60 is tilted against the input plane 21a or the battery voltage is decreased. When the voltage difference diff of the vertex (the maximum value) of the standard PRT is Dps, the voltage difference diff of the vertex (the maximum value) of the tilted PRT is Dp, the amount of shift in the horizontal direction of the vertex is Δ S, and the coil arrangement pitch (1/2) is Ls/2, a ratio of Dps to Dp (Gain) is expressed by the following expression.

$$Gain=Dps/Dp \ldots \quad (3)$$

A ratio indicating how much the vertex of the tilted PRT is displaced from the vertex of the standard PRT with respect to the range of Ls/2 (Slide) is expressed by the following expression.

$$Slide=\Delta S/(Ls/2) \ldots \quad (4)$$

Therefore, the tilted PRT can be obtained if the values of Gain and Slide are obtained.

That is, the positional error caused by the changes of the tilt angle and/or the battery voltage of the stylus 60 can be corrected by correcting the voltage difference diff, based on the values of the Gain and the Slide, with respect to the position obtained by the application of the standard PRT. The standard PRT, which is a triangle formed by the pair of PRTs, is enlarged or reduced in vertical and lateral directions, depending on the PRT to be used for the correction and the tilt direction of the stylus 60 (Dir).

Dp can be expressed by a linear expression of Rs and Vc, as shown in expression (5) below, wherein a1, a2, b1 and b2 are coefficients.

$$Dp=(a1\times Rs+a2)\times Vc+(b1\times Rs+b2) \ldots \quad (5)$$

Further, Slide can be expressed by a linear expression of Rs, as shown in expression (6) below, wherein s1 and s2 are coefficients.

$$Slide=s1\times Rs+s2 \ldots \quad (6)$$

That is, Rs and Vc can be obtained from a measured value. As Dps is obtained in advance, Gain and Slide can be obtained if the coefficients a1, a2, b1, s1 and s2 are obtained.

In order to obtain each coefficient, Dp, Vc, ΔS and Rs are measured by changing the tilt angle and the battery voltage of the stylus 60. The measurement result is shown in FIG. 14. When the angle is 0 degree, ΔS is 4.0, because the vertex of the standard PRT is positioned at 4.0 mm, as shown in FIGS. 11 and 12.

As shown in FIG. 14, Dp, Vc, ΔS and Rs, when the stylus 60 is tilted 0, 10, 20, and 30 degrees, are measured each when the battery voltage is 1.3 V, 1.4 V, 1.5 V and 1.6 V.

Each coefficient in the expressions (5) and (6) is adjusted according to the measurement result of FIG. 14. Here, the coefficients are adjusted based on the measurement result in a case where the tilt angle is 0 degree each when the battery voltage is 1.3 V, 1.4 V, and 1.5 V and in a case where the tilt angle is 30 degrees each when the battery voltage is 1.3 V, 1.4 V, and 1.5 V. As a result, a1=−0.038141, a2=0.903624, b1=37.454, b2=56.852, s1=0.092510, and s2=−0.082656.

Next, a method for determining the battery voltage of the stylus 60 will be described.

The battery voltage Vba can be expressed by functions of Vc and Rs, as shown in expression (7) below, wherein CB21, CB20, CB11, CB10, CB01 and CB00 are coefficients.

$$Vba=(CB21\times Rs+CB20)\times Vc^2+(CB11\times Rs+CB10)\times Vc+(CB01\times Rs+CB00) \ldots \quad (7)$$

Then, each coefficient in the expression (7) is adjusted according to the measurement result of FIG. 14. Here, the coefficients are adjusted based on the measurement result in a case where the tilt angle is 0 degree, each when the battery voltage is 1.3 V, 1.4 V, and 1.5 V, and in a case where the tilt angle is 30 degrees, each when the battery voltage is 1.3 V, 1.4 V, and 1.5 V. As a result, CB21=−6.8056×10⁻⁶, CB20=1.0766×10⁻⁵, CB11=0.0057852, CB10=−0.0063138, CB01=−1.2711, and CB00=2.2221.

Figure 15:
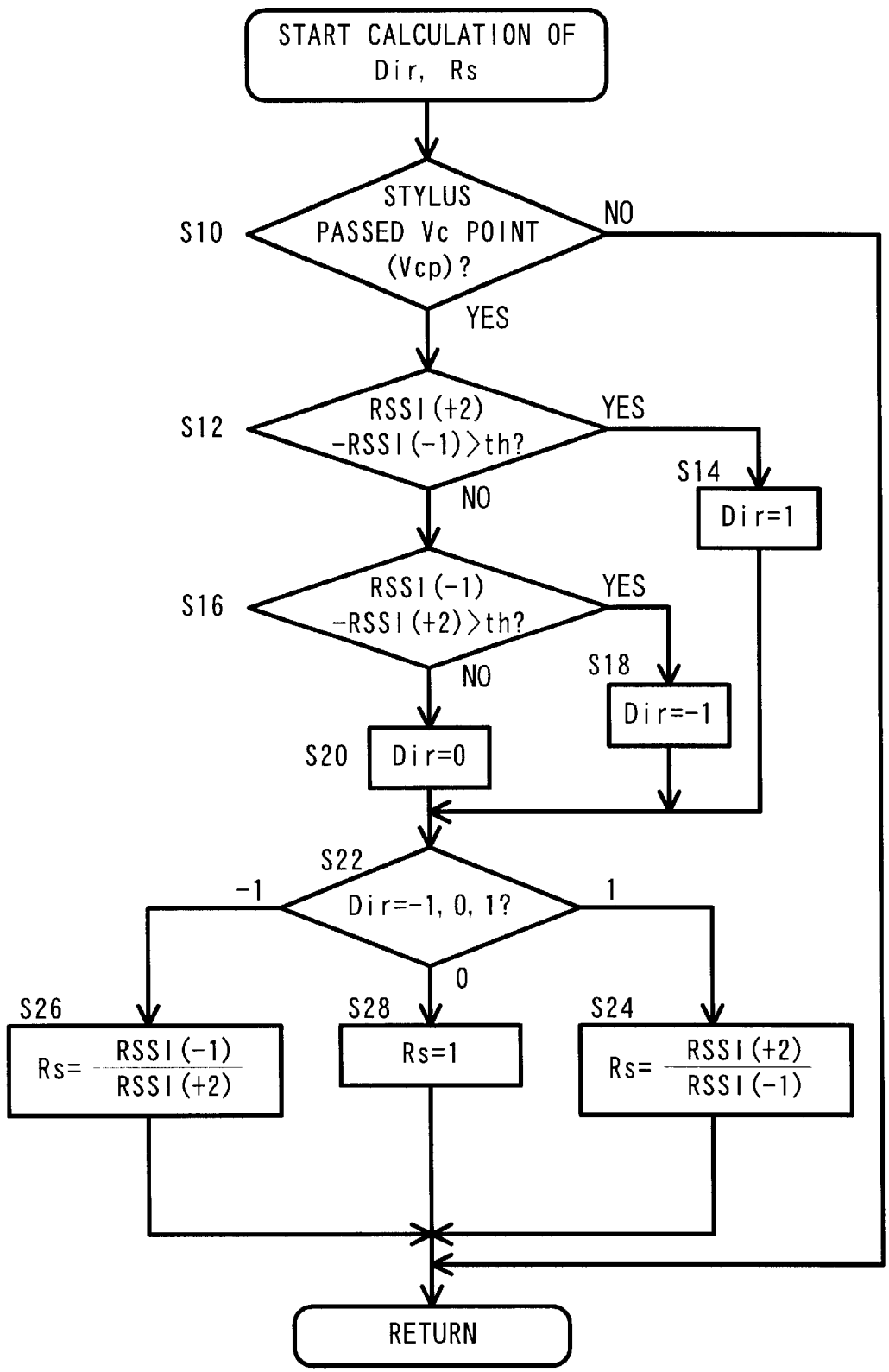
FIG. 15 is a flowchart showing calculation processing of the tilt direction Dir and Rs.
Figure 16:
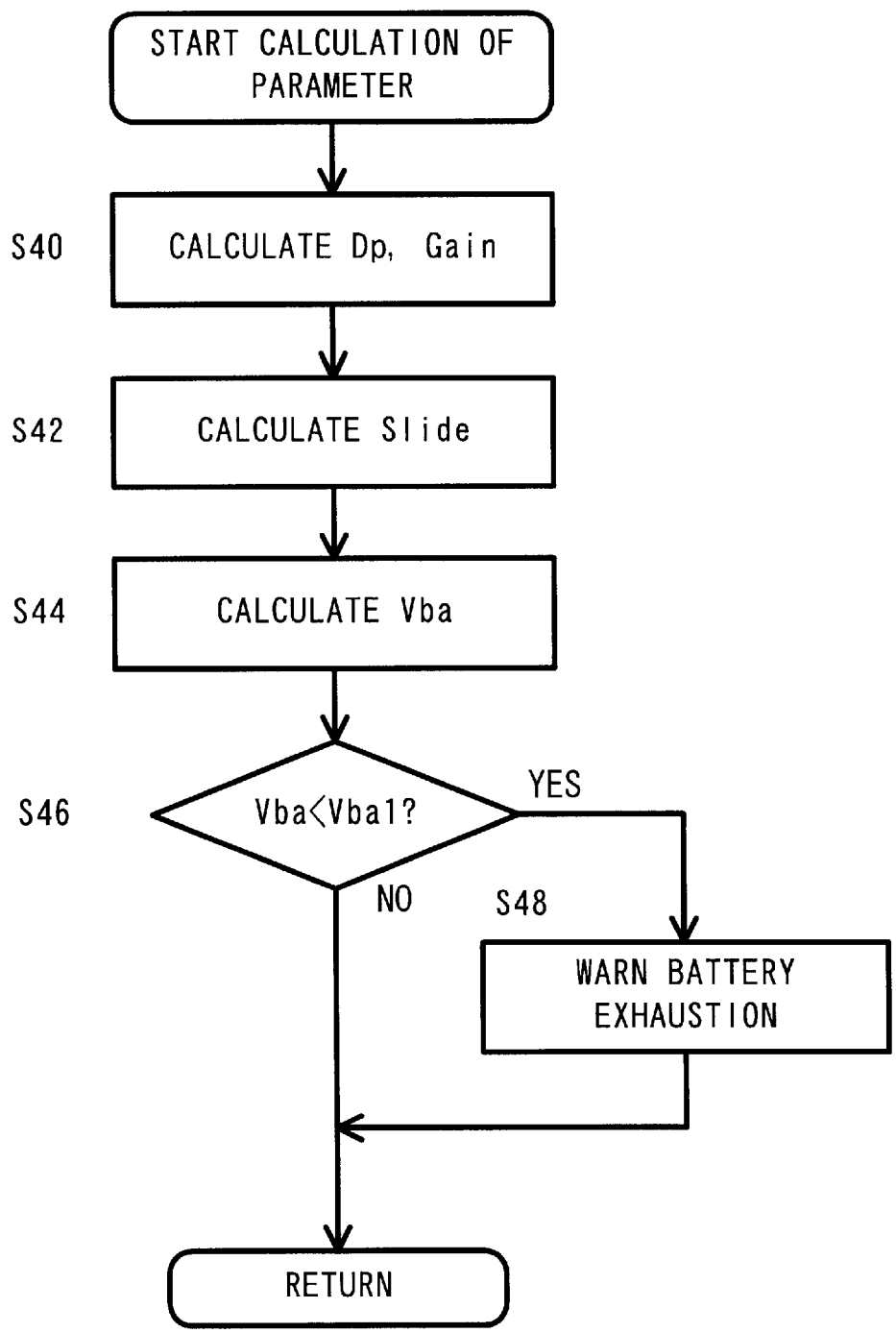
FIG. 16 is a flowchart showing corrective coefficient calculation processing.

FIG. 15 is a flowchart showing calculation processing of the tilt direction Dir and Rs. FIG. 16 is a flowchart showing calculation processing of parameters.

A CPU 56 (FIG.7) determines whether two maximum RSSIs exist in the RSSIs calculated based on the voltages detected from the coils, that is, whether the stylus 60 has passed the Vc Point (a step 10 in FIG. 15) (hereinafter, S stands for a step). When the CPU 56 determines that the stylus 60 has passed the Vc Point (S10:Yes), the CPU 56 compares the RSSI of coils outside of the two coils of the maximum RSSI. In FIG. 9, the two coils having the maximum RSSI are referred to as C(n+1) and C(n+2). The coil C(n+1) having a small coil number is referred to as a peak coil, which is used as a reference when referring to other coils.

The CPU 56 determines whether a value, that is obtained by subtracting the RSSI of the coil C(n) located immediately before the peak coil C(n+1) (in the direction of decreasing the coil number) (hereinafter referred to as RSSI(−1)) from the RSSI of the coil C(n+3) located two coils ahead (in the direction of increasing the coil number) of the peak coil C(n+1) (hereinafter referred to as RSSI(+2"))", exceeds a threshold value th (S12). When the CPU 56 determines that the value exceeds the threshold value th (S12:Yes), the tilt direction Dir is set to 1 (Dir=1) (S14). That is, as shown in FIG. 10, the stylus 60 is tilted in the direction of increasing the coil number.

When the CPU 56 determines that the value does not exceed the threshold value th (S12:No), it determines whether a value, that is obtained by subtracting the RSSI(+2) from the RSSI(−1), exceeds the threshold value th (S16). When the CPU 56 determines that the value exceeds the threshold value th (S16:Yes), the tilt direction Dir is set to −1 (Dir=−1) (S18). That is, as shown in FIG. 10, the stylus 60 is tilted in the direction of decreasing the coil number.

When the CPU 56 determines that the value does not exceed the threshold value th at S12 or S16 (S12:No, S16:No), the tilt direction Dir is set to 0 (Dir=0). That is, as shown in FIG. 10, the stylus 60 is perpendicular to the input plane 21*a* (not tilted with respect to the input plane 21*a*).

Then, the CPU 56 determines the value of the tilt direction Dir (S22). When the tilt direction Dir is 1 (S22:1), the CPU 56 calculates Rs by dividing RSSI(+2) by RSSI(−1) (S24). When the tilt direction Dir is −1 (S22:−1), the CPU 56 calculates Rs by dividing RSSI(−1) by RSSI(+2) (S26). When the tilt direction Dir is 0 (S22:0), Rs is set to 1 (Rs=1) (S28). In this embodiment, the threshold value th is, for example, 5 to 10.

Next, the CPU 56 calculates Dp by substituting the obtained Rs and Vc into the expression (5), and then calculates Gain by substituting the obtained Dp and Dps into the expression (3) (S40 in FIG. 16). Then, the CPU 56 calculates Slide by substituting Rs into the expression (6) (S42) and a battery voltage Vba (S44) by substituting Rs and Vc into the expression (7). After that, the CPU 56 determines whether the obtained Vba is smaller than the predetermined threshold value Vba1 (S46). When the battery voltage Vba is smaller than the threshold value Vba1 (S46:Yes), the CPU 56 warns the battery exhaustion (S48). For example, the LED battery display 39 (FIG. 1) lights or flashes.

As described above, when an image is actually drawn on the input plane 21*a* by the stylus 60, the parameters Vc and Rs are detected every time the stylus 60 passes the Vc Point, so that Gain, Slide, Vba and the tilt direction Dir are calculated and stored by the attribute of the stylus 60.

Next, calculation processing of the positional coordinate will be described. A side indicates a positional relationship between the coil of the maximum voltage and the coil adjacent the coil of the maximum voltage. When the coil of the maximum voltage (the coil C(n+1)) and the coil adjacent the coil of the maximum voltage (the coil C(n+2)) are arranged in this order with respect to the scanning direction, the side is 1 (side=1). When the coil adjacent the coil of the maximum RSSI (the coil C(n+2)) and the coil of the maximum voltage (the coil C(n+1)) are arranged in this order with respect to the scanning direction, the side is −1 (side=−1).

Figure 17:
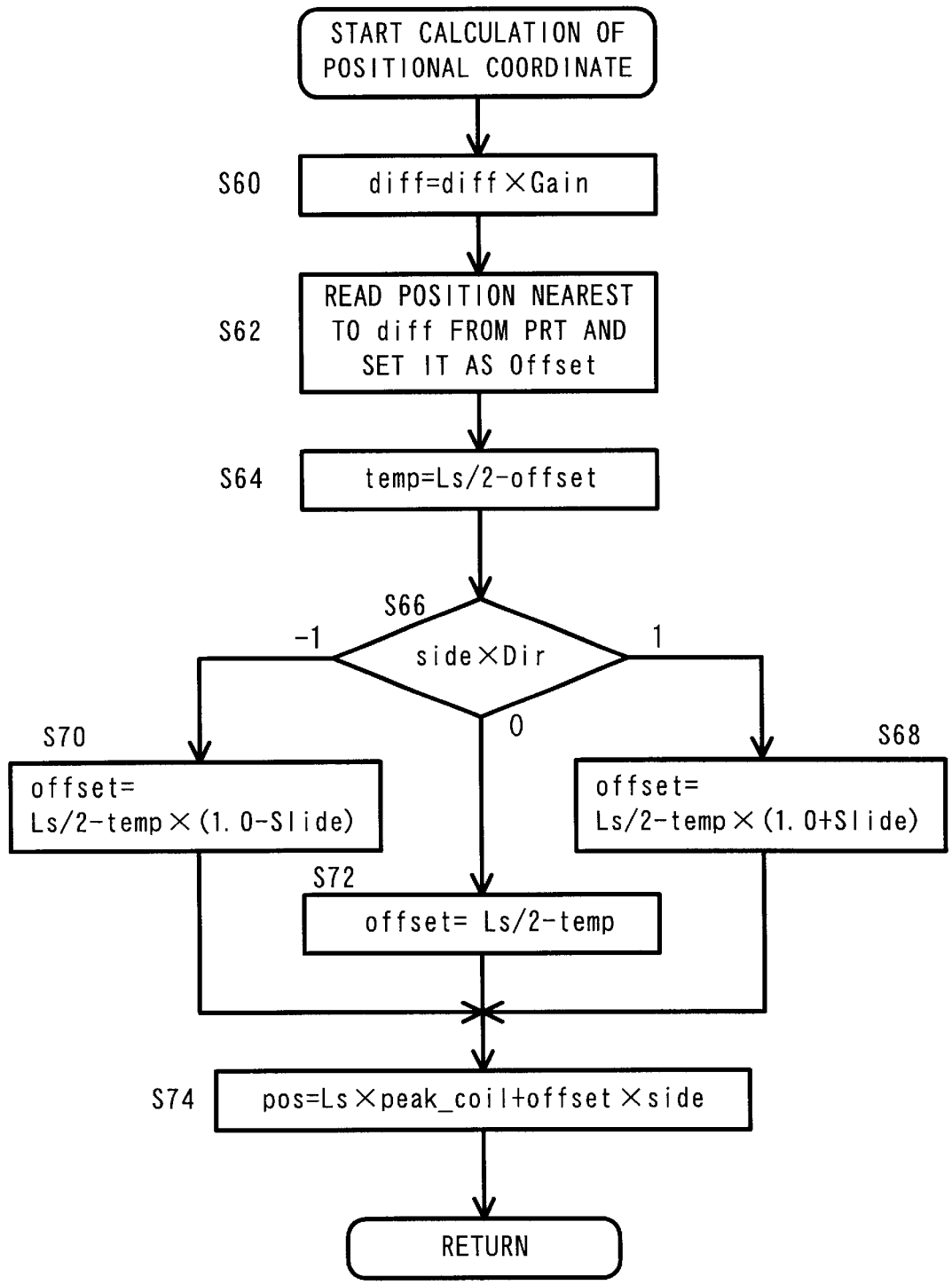
FIG. 17 is a flowchart showing coordinate calculation processing.
Figure 18A:
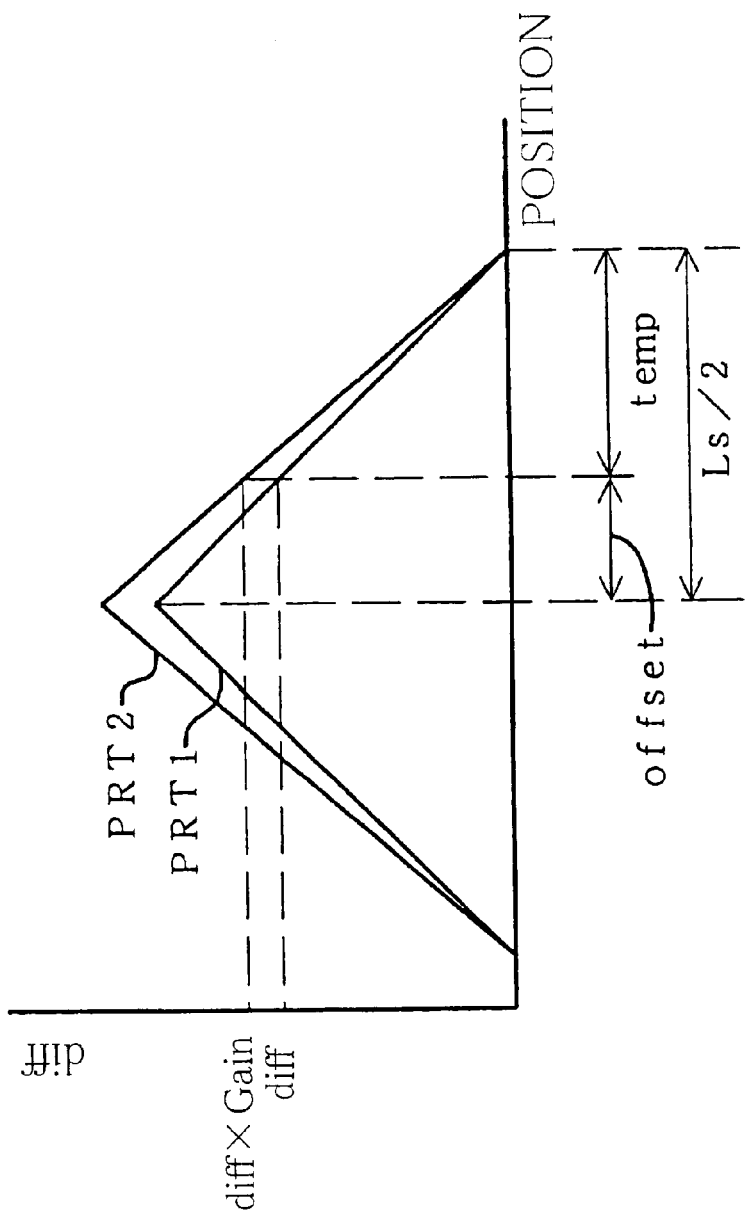
FIG. 18A is an explanatory view showing a PRT2 (Position Resolving Table) formed by which a PRT1 is corrected in a vertical (diff) axis direction.

The CPU 56 calculates the voltage difference diff in which RSSI of the coil generating a second largest voltage is subtracted from RSSI of the coil of the maximum voltage, and then multiples the voltage difference diff by the Gain obtained at S40 (S60 in FIG. 17). Thus, the current PRT1 can be corrected in the vertical axis (diff) direction. The corrected PRT1 is referred to as a PRT2, shown in FIG. 18A.

Then, the CPU 56 reads a point (position) nearest to the voltage difference diff obtained at S60 from the corrected PRT2 and sets it to offset (S62 in FIG. 17). After that, the CPU 56 temporarily stores a value obtained by subtracting the offset from Ls/2 (temp), that is, a horizontal distance between the point and a right origin point of the PRT2 (S64).

The CPU 56 determines a value of side×Dir (S66), that is, whether the PRT2, which is a triangle formed by a pair of PRTs, should be enlarged (when the side×Dir is 1), should be reduced (when side×Dir is −1), or should not be changed (when side×Dir is 0). When side×Dir is 1 (S66:1), the CPU 56 subtracts temp from Ls/2, then further subtracts temp× Slide from the obtained value, and sets the final obtained value as offset (S68).

Figure 18B:
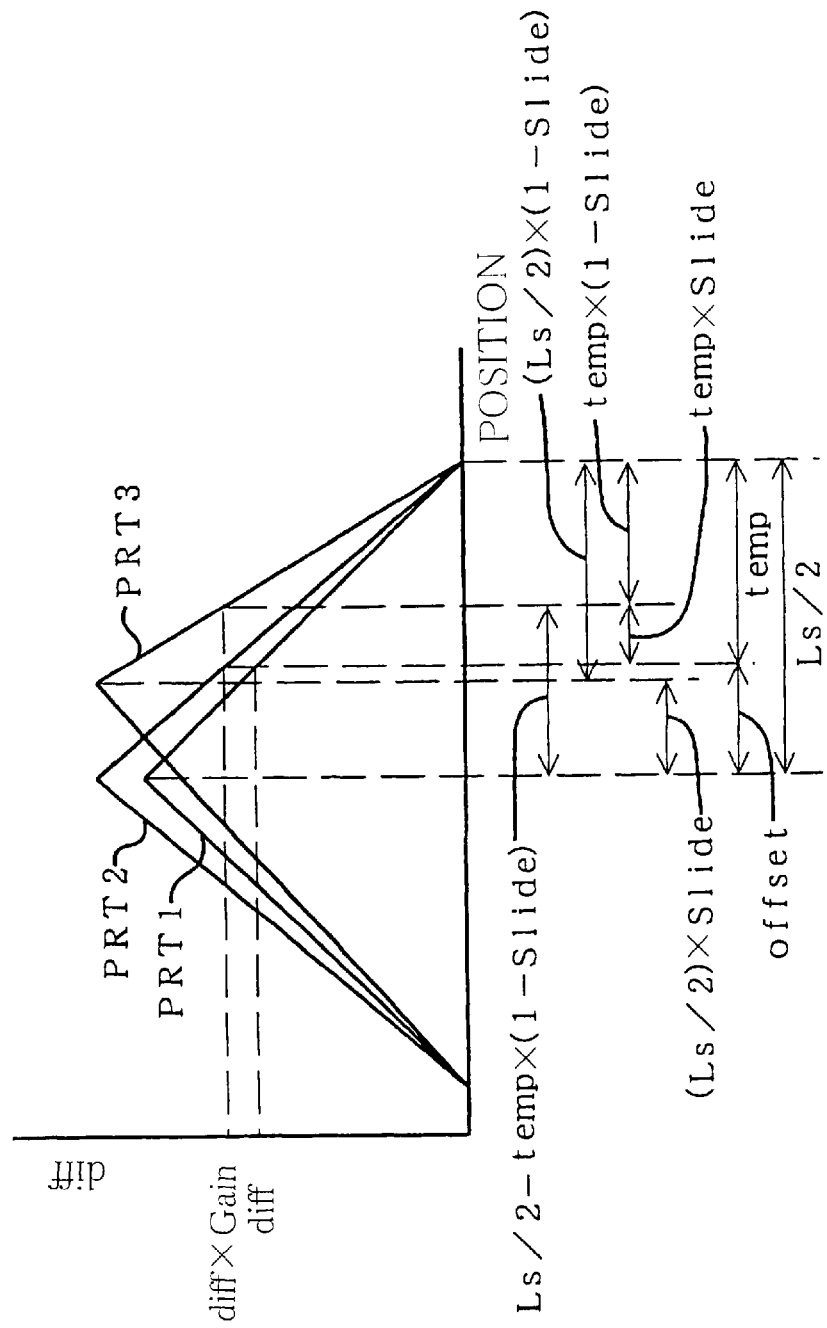
FIG. 18B is an explanatory view showing a PRT3 formed by which the PRT2 is corrected in a lateral axis direction when side×Dir is −1.

When side×Dir is −1 (S66:−1), temp is subtracted from Ls/2 and temp×Slide is added to the obtained value. Then, the finally obtained value is set as offset (S70). A PRT3 shown in FIG. 18B shows the case where side×Dir is −1.

When side×Dir is 0 (S66:0), a value obtained by subtracting temp from Ls/2 is set as offset (S72).

Then, the CPU 56 calculates a position pos by adding offset×Slide to a value obtained by multiplying the coil pitch Ls by the peak coil number (S74).

Figure 19:
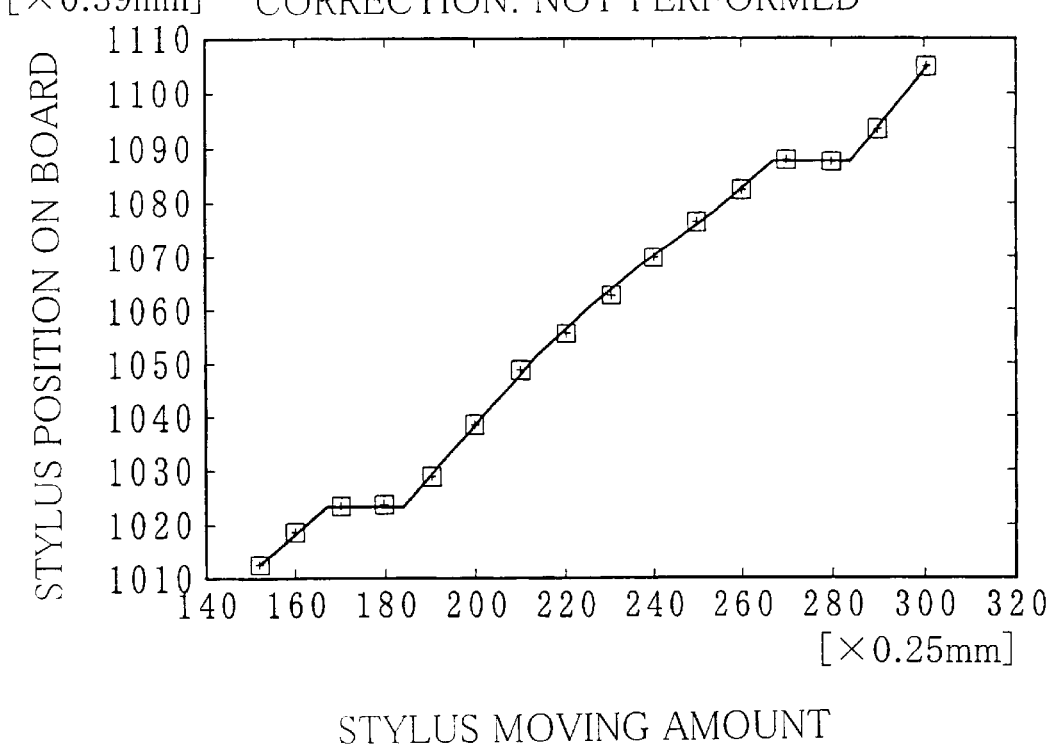
FIG. 19 is a plot showing a relationship between an actual position of the stylus on the input plane and a moving amount of the stylus obtained from a detected voltage when the stylus is tilted 30 degrees with battery voltage of 1600 mV and the linear correction is not performed.
Figure 20:
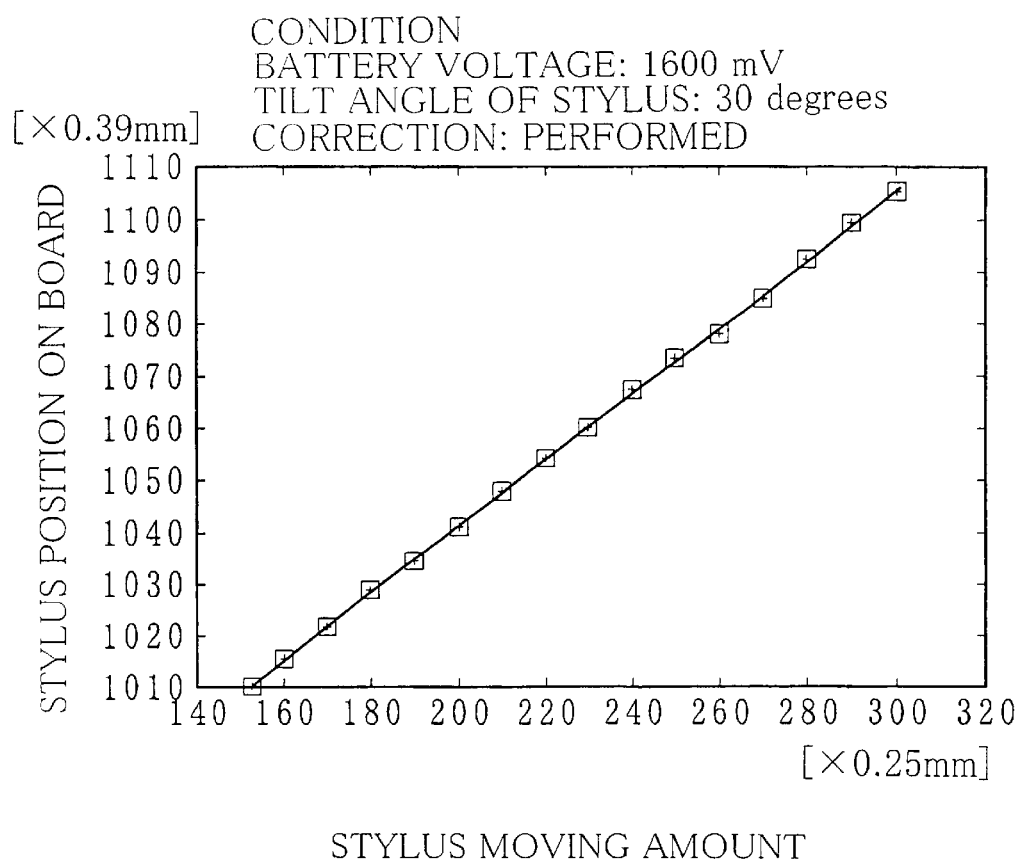
FIG. 20 is a plot showing a relationship between an actual position of the stylus on the input plane and a moving amount of the stylus obtained from a detected voltage when the stylus is tilted 30 degrees with battery voltage of 1600 mV and the linear correction is performed.
Figure 21:
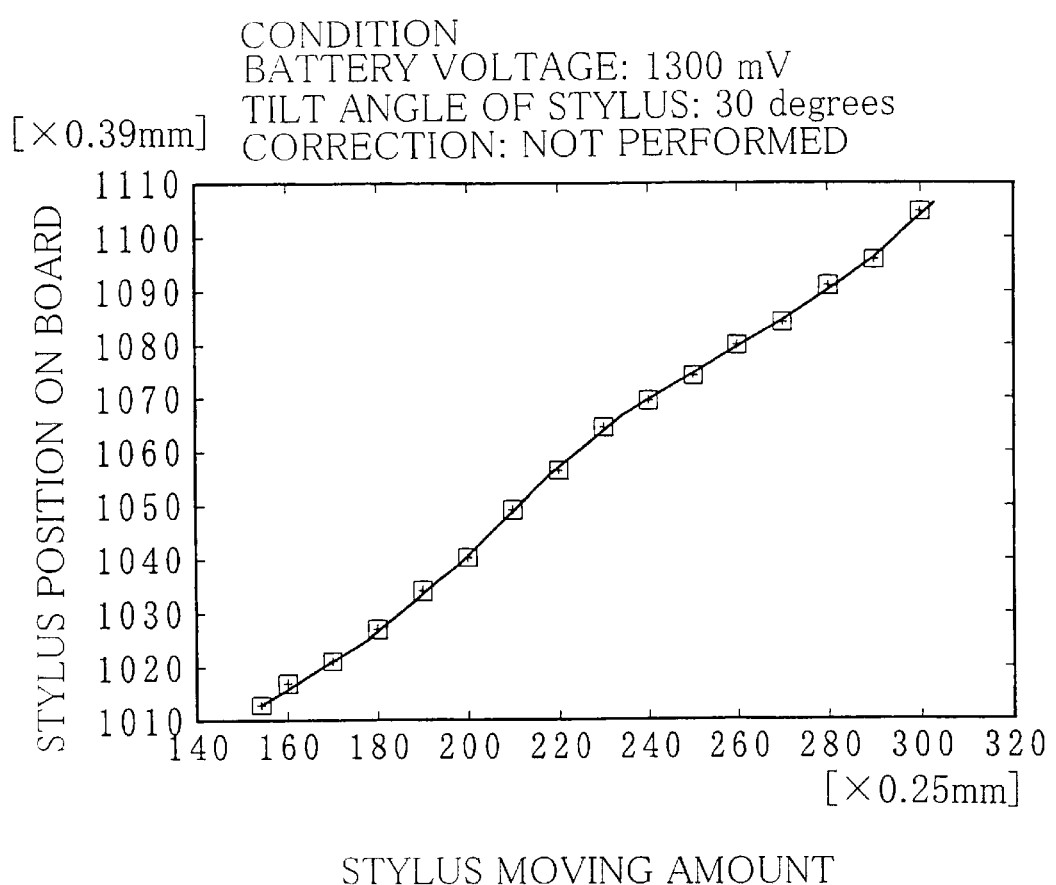
FIG. 21 is a plot showing a relationship between an actual position of the stylus on the input plane and a moving amount of the stylus obtained from a detected voltage when the stylus is tilted 30 degrees with battery voltage of 1300 mV and the linear correction is not performed.
Figure 22:
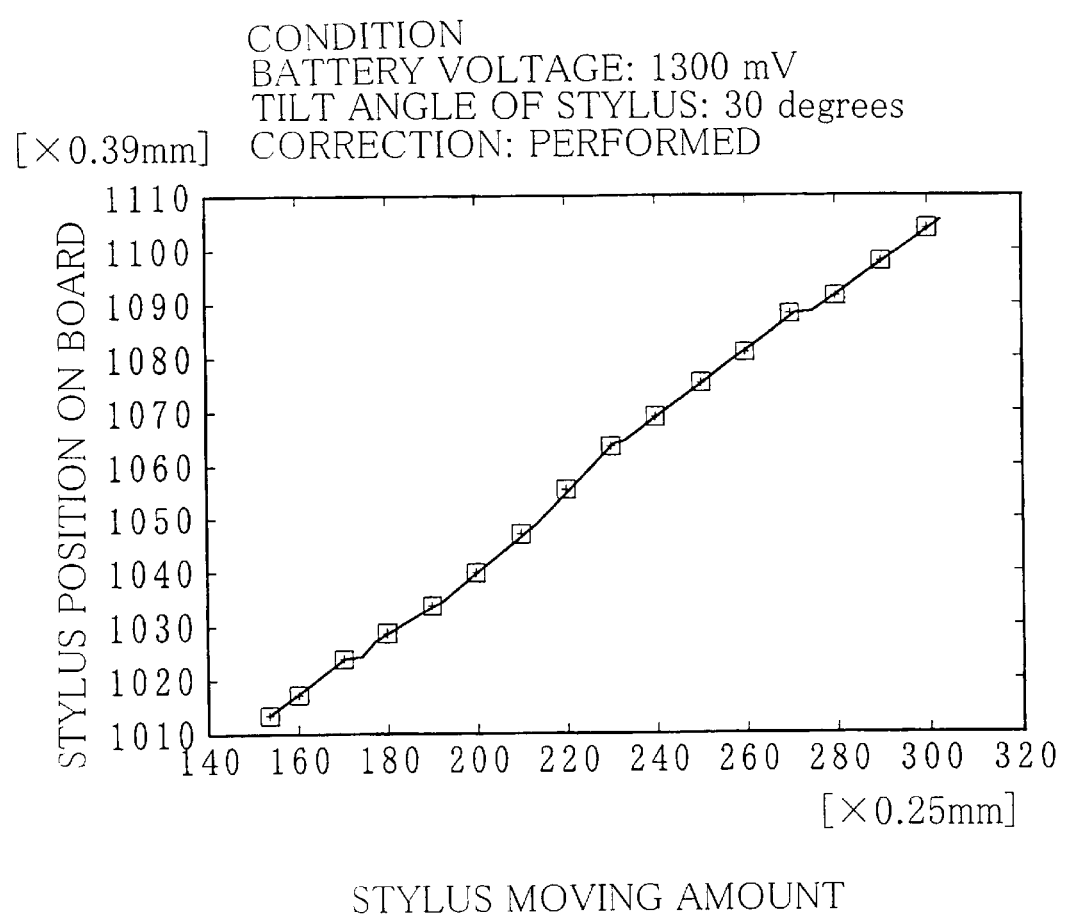
FIG. 22 is a plot showing a relationship between an actual position of the stylus on the input plane and a moving amount of the stylus obtained from a detected voltage when the stylus is tilted 30 degrees with battery voltage of 1300 mV and the linear correction is performed.

FIGS. 19 to 22 are plots showing a relationship between an actual position of the stylus 60 on the input plane 21a and a position of the stylus 60 obtained from a detected voltage (the position pos obtained at S74). FIG. 19 is a plot showing a relationship between an actual position of the stylus 60 on the input plane 21a and a moving amount of the stylus 60 obtained from a detected voltage when the stylus 60 is tilted 30 degrees with battery voltage of 1600 mV and the linear correction is not performed. FIG. 20 is a plot showing a relationship between an actual position of the stylus 60 on the input plane 21a and a moving amount of the stylus 60 obtained from a detected voltage when the stylus 60 is tilted 30 degrees with battery voltage of 1600 mV and the linear correction is performed. FIG. 21 is a plot showing a relationship between an actual position of the stylus 60 on the input plane 21a and a moving amount of the stylus 60 obtained from a detected voltage when the stylus 60 is tilted 30 degrees with battery voltage of 1300 mV and the linear correction is not performed. FIG. 22 is a plot showing a relationship between an actual position of the stylus 60 on the input plane 21a and a moving amount of the stylus 60 obtained from a detected voltage when the stylus 60 is tilted 30 degrees with battery voltage of 1300 mV and the linear correction is performed.

Figure 23:
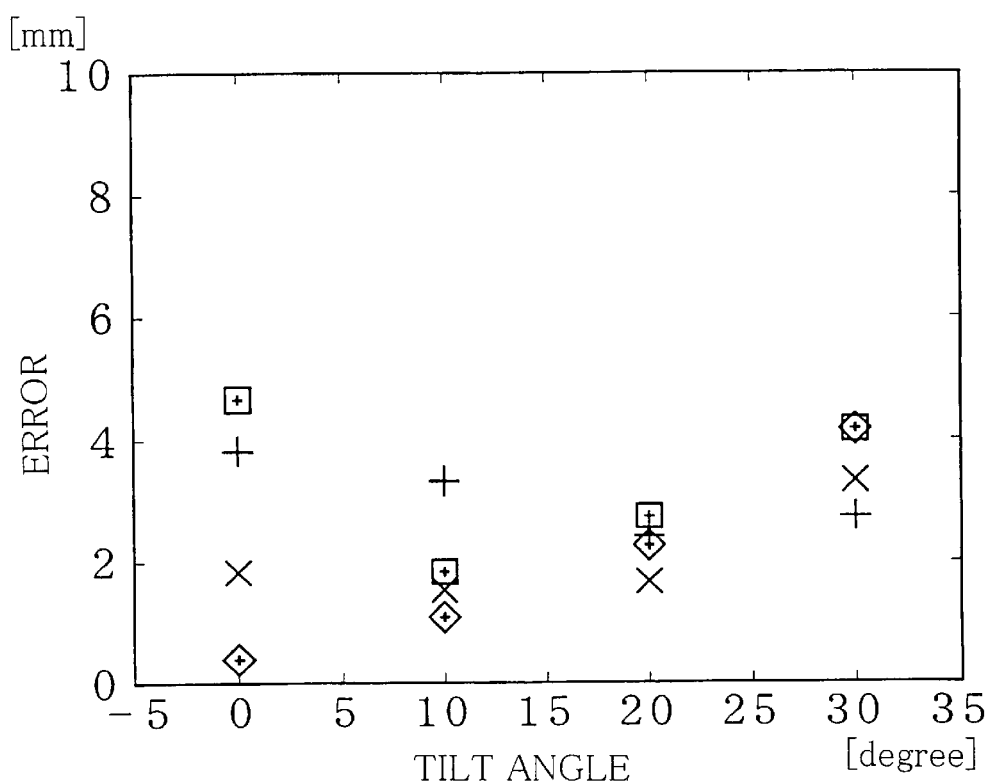
FIG. 23 is a plot showing the amount of deviation of the detected position from the actual position of the stylus each when the battery voltage is 1300 mV, 1400 mV, 1500 mV, and 1600 mV, the tilt angle of the stylus is 0, 10, 20, and 30 degrees, and the linear correction is not performed.
Figure 24:
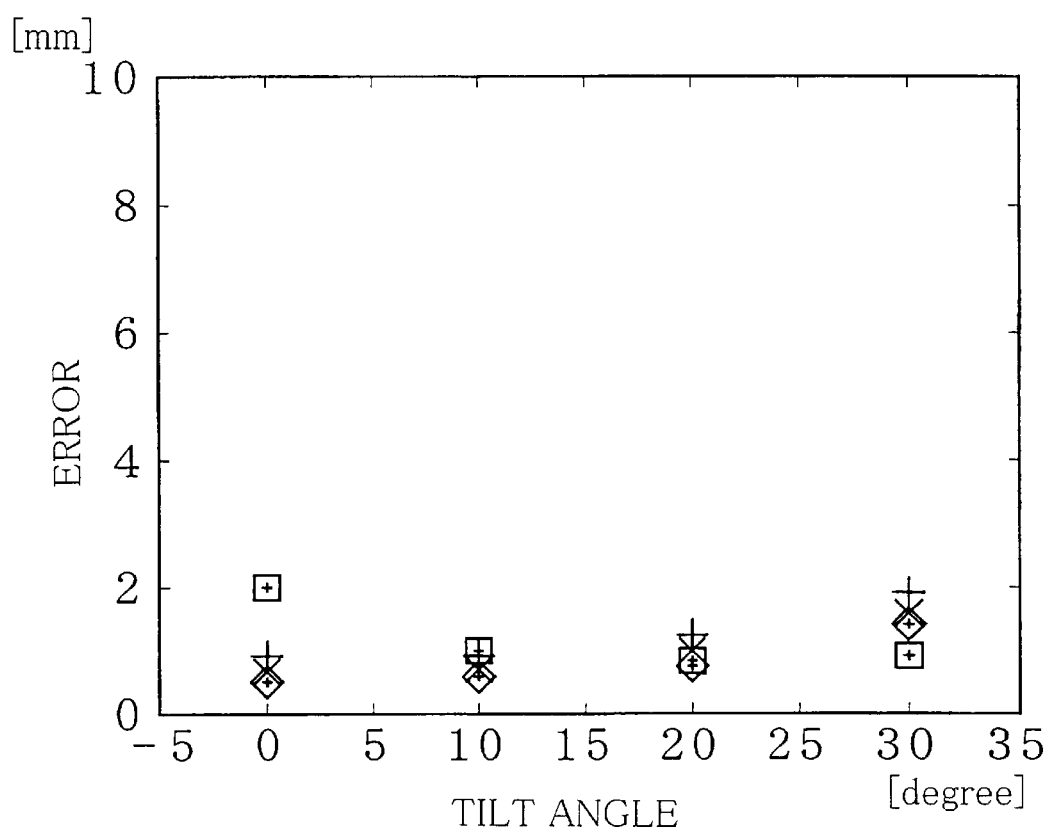
FIG. 24 is a plot showing the amount of deviation of the detected position from the actual position of the stylus 60 each when the battery voltage is 1300 mV, 1400 mV, 1500 mV, and 1600 mV, the tilt angle of the stylus is 0, 10, 20, and 30 degrees, and the linear correction is performed.

FIGS. 23 and 24 are plots showing the amount of deviation (error) of the detected position from the actual position of the stylus 60 each when the battery voltage is 1300 mV, 1400 mV, 1500 mV, and 1600 mV and the tilt angle of the stylus 60 is 0, 10, 20, and 30 degrees. FIG. 23 shows the deviations when the linear correction is not performed. FIG. 24 shows the deviations when the linear correction is performed.

As can be seen from comparing with FIGS. 23 and 24, the amount of deviation is reduced to approximately less than half by the linear correction. Thus, it can be understood that the linear correction produces a great effect on correction of the errors. As can be seen from FIGS. 19 and 20, when the stylus 60 is tilted 30 degrees with the battery voltage of 1600 mV, the error is reduced to approximately 22%. The error at that time is 0.9 mm (approximately 2.3 dot since 1 dot equals 0.4 mm in this embodiment).

FIG. 25 is a table comparing an actual battery voltage and a detected battery voltage of the stylus 60 each when the tilt angle of the stylus 60 is 0, 10, 20, and 30 degrees. As shown in FIG. 25, there is little or no difference between the actual battery voltage and the detected battery voltage, regardless of the tilt angle of the stylus 60. For example, when the actual battery voltage is 1300 mV, the detected voltage is between 1289 mV and 1300 mV. The error is 11 mV (approximately 0.01 V) at the maximum. It is thus apparent that the battery voltage can be detected with high accuracy.

Next, the dynamic correction will be described. According to the linear correction described above, the error of the position of the stylus 60 can be corrected with high accuracy by the relatively simple calculation.

Figure 28:
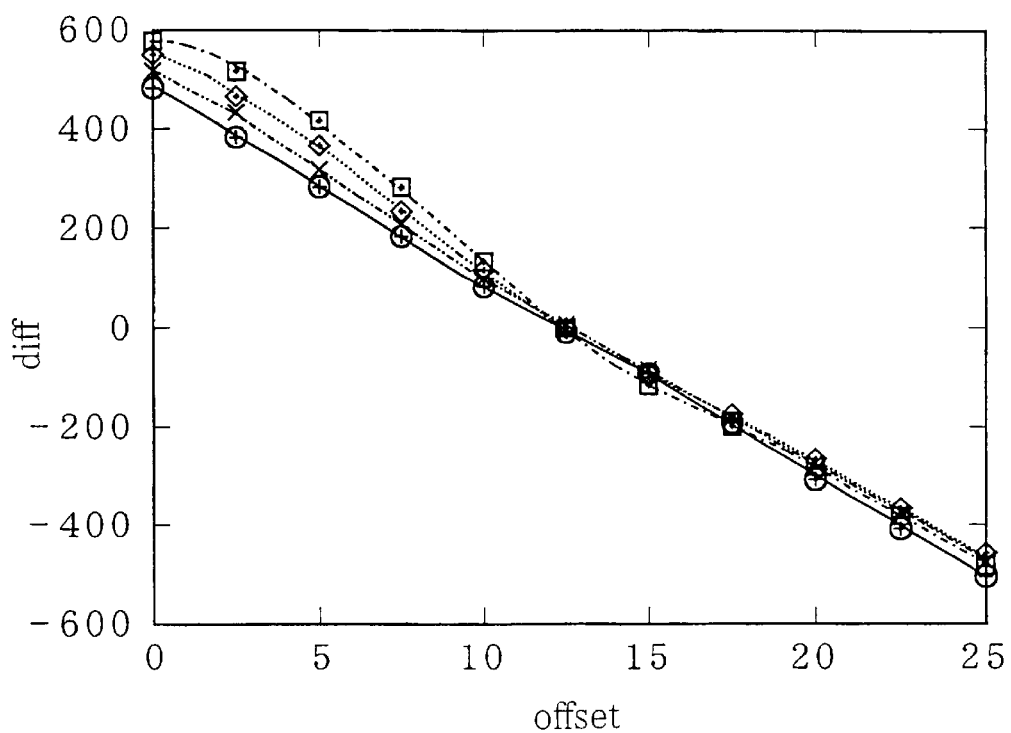
FIG. 28 is a graph showing the voltage difference diff in one coil pitch due to the tilt of the stylus.

However, when PRT is not linear, the position error becomes large. As a result, a sufficient effect may not be produced by the linear correction. FIG. 28 is a graph showing the voltage difference diff in one coil pitch due to tilt of the stylus 60. It can be seen from the graph that even when the battery voltage of the stylus 60 is always 1500 mV, the graph of the voltage difference diff varies due to the change of the tilt angle of the stylus 60.

Therefore, a relationship between offset and the voltage difference diff is expressed by an equation in which each coefficient is expressed by a polynomial of Vc and Rs (Position Resolving Equation, hereinafter referred to as PRE).

$$\text{offset} = \sum_{i=0}^{5} coef[i] \times diff^i \quad (8)$$

In the expression (8), coef[i] is made approximation by a quadratic expression of Vc and Rs as described below.

$$coef[i]=c[i]+v1[i]\times Vc+v2[i]\times Vc^2+r1[i]\times Rs+r2[i]\times Rs^2+m[]\times Vc\times Rs \ldots \quad (9)$$

The coefficient coef[i] is obtained as described below.

First, PRE, which is made approximation by a quintic polynomial, is obtained based on data of four coils in one coil pitch (data of two coils adjacent to the coil generating the maximum voltage and two coils on the outside of the two coils adjacent to the coil of the maximum voltage) in each combination of the battery voltage of 1300 mV, 1400 mV, 1500 mV, 1600 mV, and the tilt angle of the stylus 60 of 0, 10, 20, 30 degrees.

Next, the coefficient coef[i] of the same degree is removed from each polynomial.

Then, each removed coefficient coef[i] is arranged using a quadratic polynomial of Vc and Rs.

Thus, the coefficient coef[i] of the PRE varies according to the changes of the battery voltage and the tilt angle of the stylus 60.

Next, calculation processing of parameters and coordinates executed by the CPU 56 (FIG. 7) will be described with reference to FIGS. 26 and 27.

Figure 26:
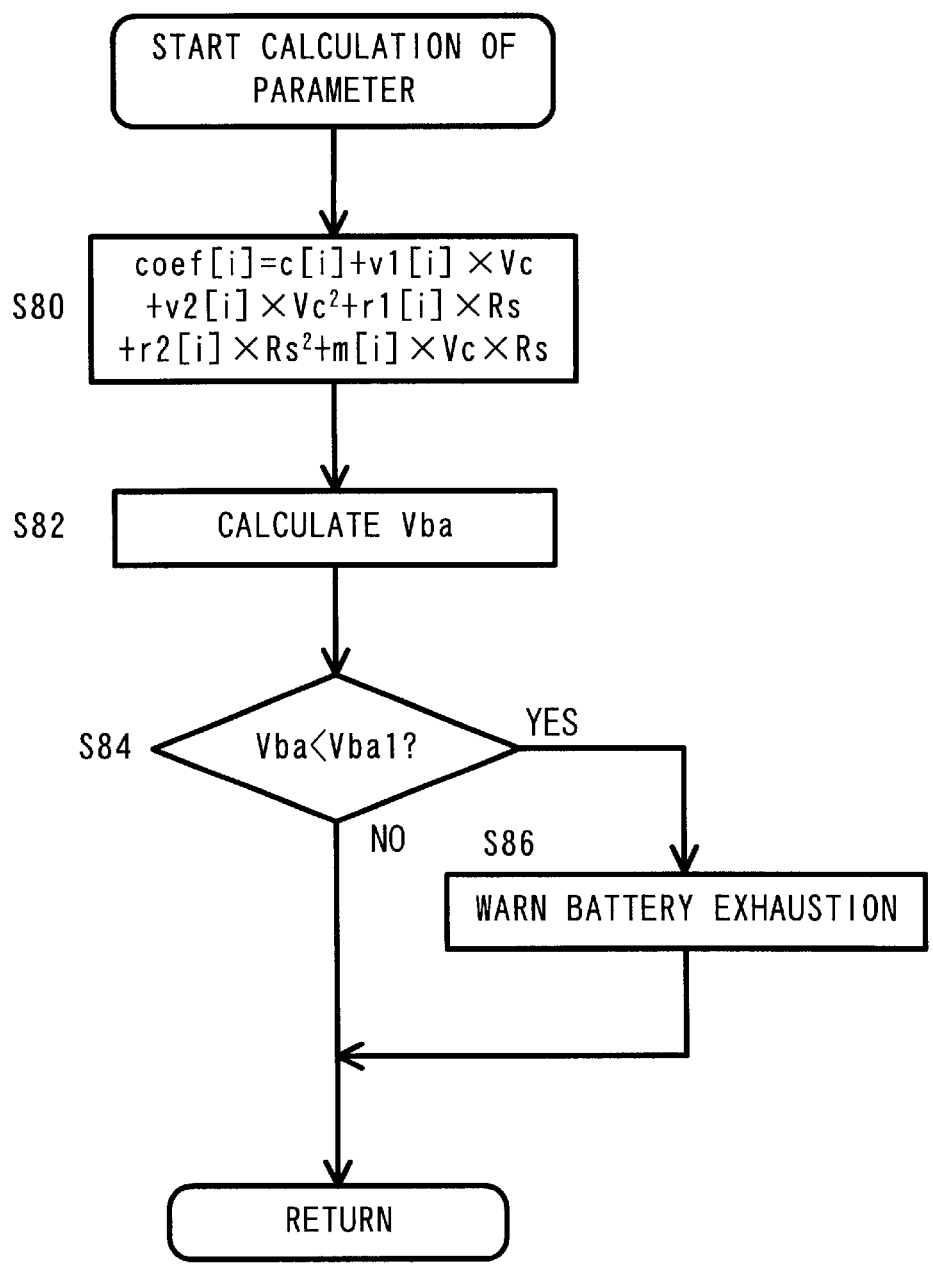
FIG. 26 is a flowchart of parameter calculation processing.
Figure 27:
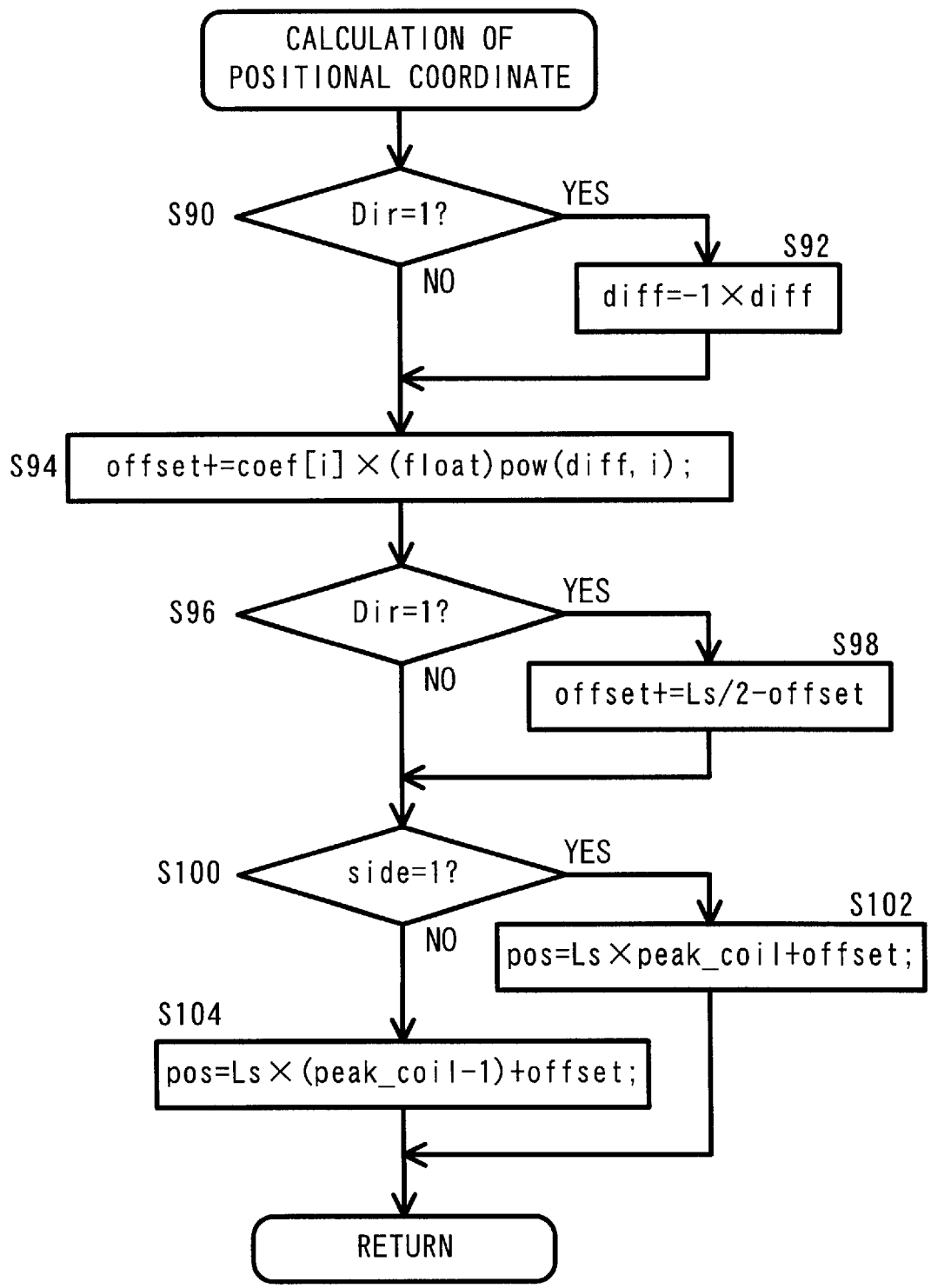
FIG. 27 is a flowchart of coordinate calculation processing.

FIG. 26 is a flowchart showing parameter calculation processing. FIG. 27 is a flowchart showing coordinate calculation processing.

When the CPU 56 detects that the stylus 60 has passed the Vc Point, the CPU 56 calculates the tilt direction Dir and Rs by the same processing as the linear correction (FIG. 15). Then, the CPU 56 substitutes the obtained tilt direction Dir and Rs into the expression (9) to calculate the coefficient coef[i] by substituting 0 to 5 into [i] (S80). After that, the CPU 56 calculates the battery voltage Vba based on the expression (7) using the same calculation method as the linear correction (S82).

Then, the CPU 56 determines whether the battery voltage Vba is lower than the predetermined threshold value Vba1 (S84). When it is lower than the threshold value Vba1 (S84:Yes), the CPU 56 warns the battery exhaustion (S86). For example, the LED battery display 39 (FIG. 1) lights or flashes (S86).

As described above, when images are actually drawn on the input plane 21*a* by the stylus 60, the offset and the battery voltage Vba are calculated and stored by the attributes of the stylus 60 every time the stylus 60 passes the Vc Point.

Next, the coordinate calculation processing will be described. The side indicates a positional relationship between the coil of the maximum voltage and the coil adjacent the coil of the maximum voltage. When the coil of the maximum voltage (the coil C(n+1)) and the coil adjacent the coil of the maximum voltage (the coil C(n+2)) are arranged in this order, the side is 1 (side=1). When the coil adjacent the coil of the maximum voltage (the coil C(n+2)) and the coil of the maximum voltage (the coil C(n+1)) are arranged in this order, the side is −1 (side=−1).

When the CPU 56 determines that the tilt direction Dir is 1 (S90:Yes), the voltage difference diff is set to −1×diff (diff=−1×diff) (S92). Then, the CPU 56 calculates offset by substituting the coefficient coef[i] obtained at S80 and the voltage difference diff into the right side of the expression (8) (S94). Then, when the CPU 56 determines that the tilt direction Dir is 1 (S96:Yes), a value obtained by subtracting the offset from Ls/2 is set as offset+ (S98).

After that, when the CPU 56 determines that the side is 1 (S100:Yes), the CPU 56 calculates the expression pos=Ls×peak_coil+offset (S102). When the CPU 56 determines that the side is not 1 (S100:No), the CPU 56 calculates the expression pos=Ls×(peak_coil−1)+offset (S104).

Figure 29:
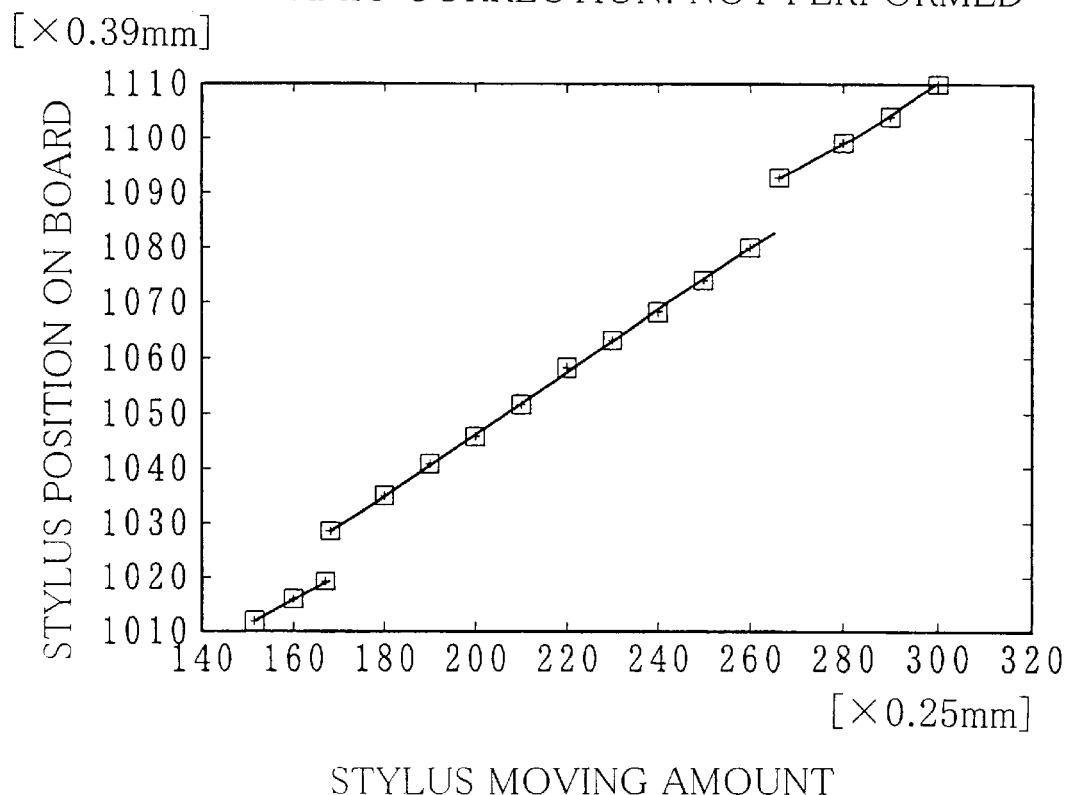
FIG. 29 is a plot showing a relationship between an actual position of the stylus on the input plane and a moving amount of the stylus obtained from a detected voltage when the stylus is not titled with the battery voltage of 1300 mV and the dynamic correction is not performed.
Figure 30:
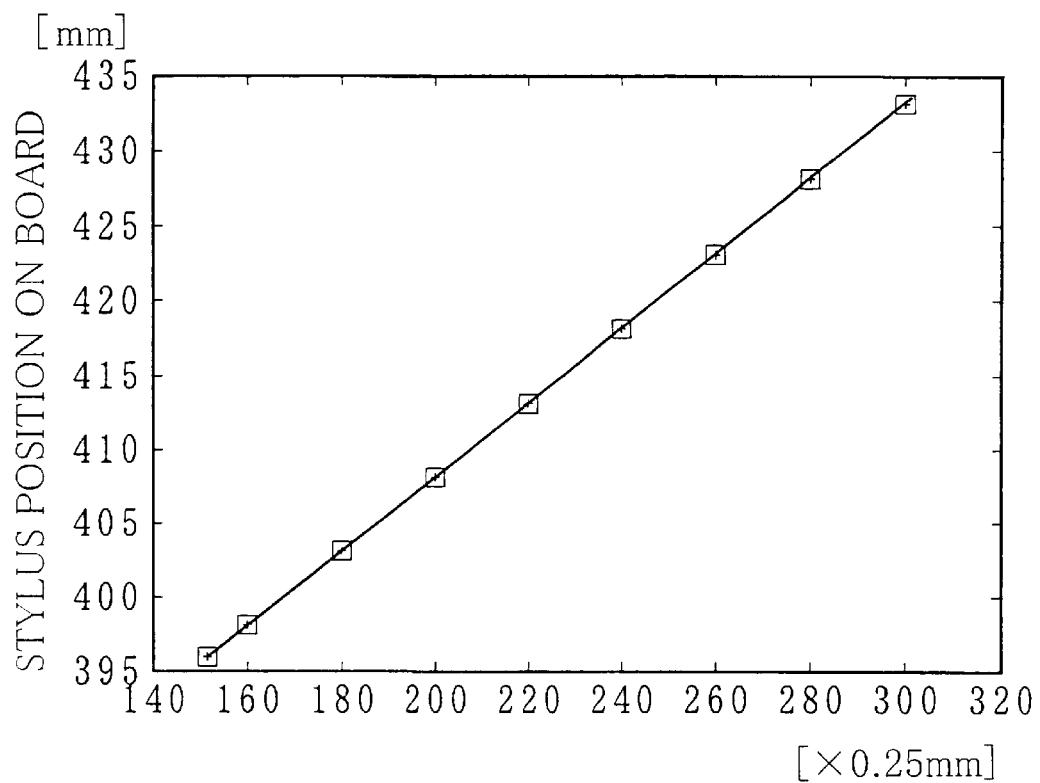
FIG. 30 is a plot showing a relationship between an actual position of the stylus on the input plane and a moving amount of the stylus obtained from a detected voltage when the stylus is not titled with the battery voltage of 1300 mV and the dynamic correction is performed.

FIGS. 29 and 30 are plots showing a relationship between an actual position of the stylus 60 on the input plane 21*a* and a position of the stylus 60 obtained from a detected voltage (the position pos obtained at S102 and S104). FIG. 29 is a plot showing a relationship between an actual position of the stylus 60 on the input plane 21*a* and a moving amount of the stylus 60 obtained from a detected voltage when the stylus 60 is not titled (is perpendicular to the input plane 21*a*) with the battery voltage of 1300 mV and the dynamic correction is not performed. FIG. 30 is a plot showing a relationship between an actual position of the stylus 60 on the input plane 21*a* and a moving amount of the stylus 60 obtained from a detected voltage when the stylus 60 is not titled with the battery voltage of 1300 mV and the dynamic correction is performed.

Figure 31:
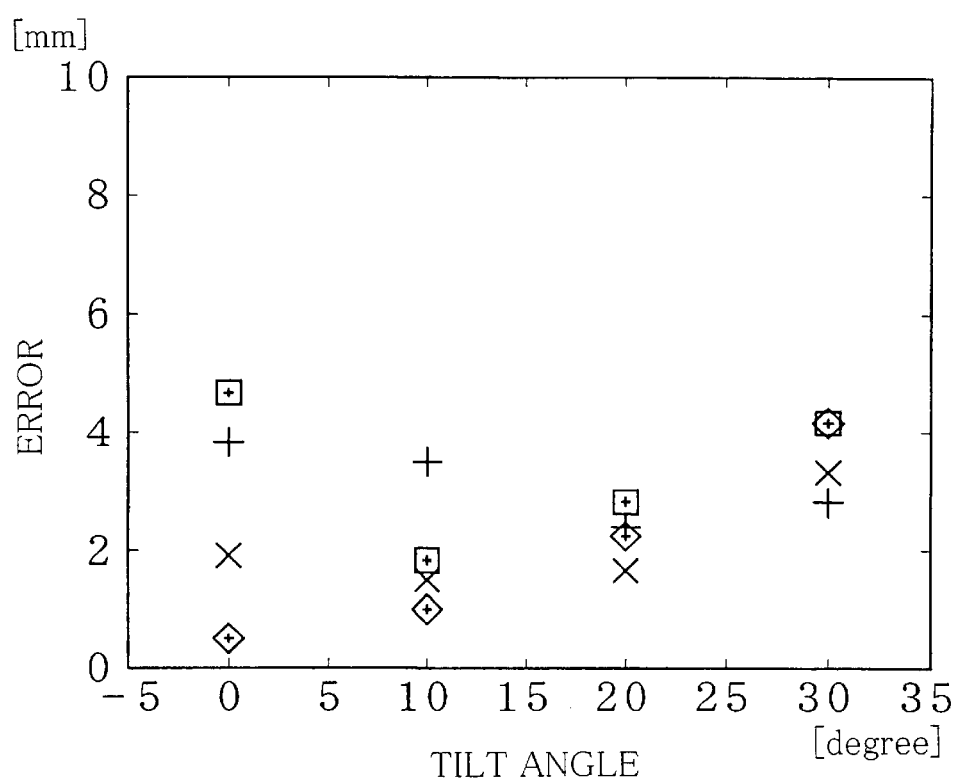
FIG. 31 is a plot showing the amount of deviation (error) of the detected position from the actual position of the stylus each when the battery voltage is 1300 mV, 1400 mV, 1500 mV, and 1600 mV, the tilt angle of the stylus is 0, 10, 20, and 30 degrees, and a dynamic correction is not performed.
Figure 32:
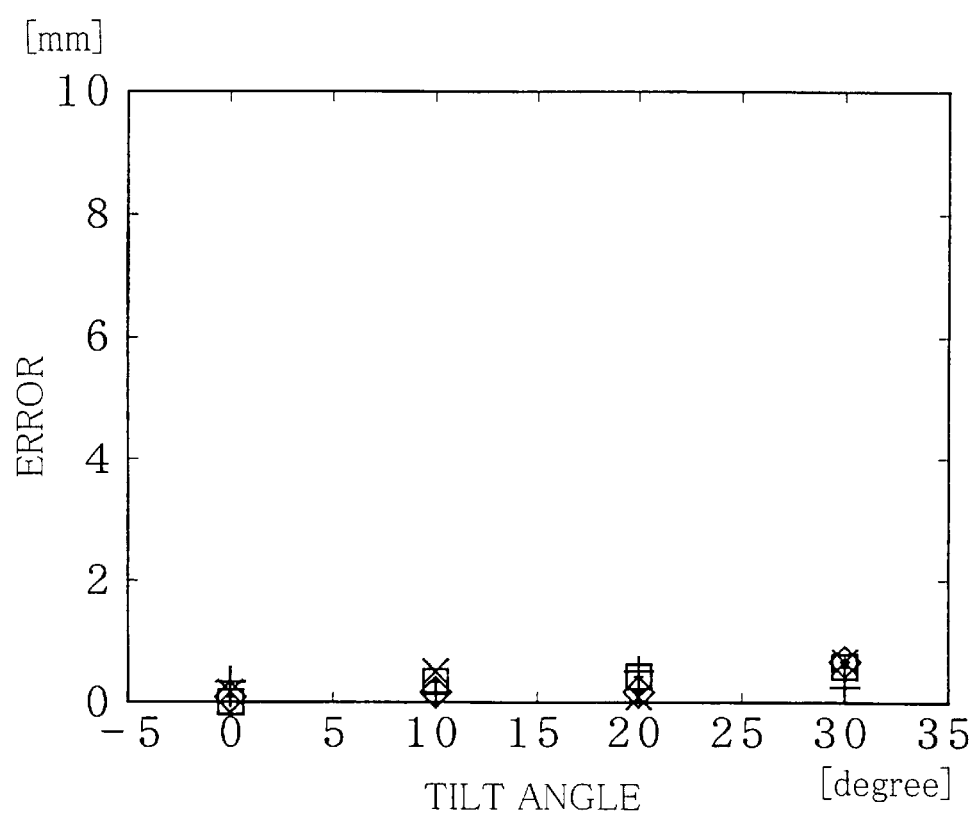
FIG. 32 is a plot showing the amount of deviation (error) of the detected position from the actual position of the stylus each when the battery voltage is 1300 mV, 1400 mV, 1500 mV, and 1600 mV, the tilt angle of the stylus is 0, 10, 20, and 30 degrees, and a dynamic correction is performed.

FIGS. 31 and 32 are plots showing the amount of deviation (error) of the detected position from the actual position of the stylus 60 each when the battery voltage is 1300 mV, 1400 mV, 1500 mV, and 1600 mV and the tilt angle of the stylus 60 is 0, 10, 20, and 30 degrees. FIG. 31 is a plot of the amount of deviation when the dynamic correction is not performed. FIG. 32 is a plot of the amount of deviation when the dynamic correction is performed.

As can be seen from comparing FIG. 31 with FIG. 32, the amount of deviation is significantly reduced by the dynamic correction. It can be regarded that the dynamic correction produces a great effect on correction of the errors. The amount of deviation after performing the dynamic correction is small, as compared with FIG. 24 showing the amount of deviation after performing the linear deviation.

It appears that variations in measured data or the severity of adjustment affect the correction. If weights are assigned to the adjustment, it seems that the errors can be intensively reduced under a specific condition.

Figure 33:
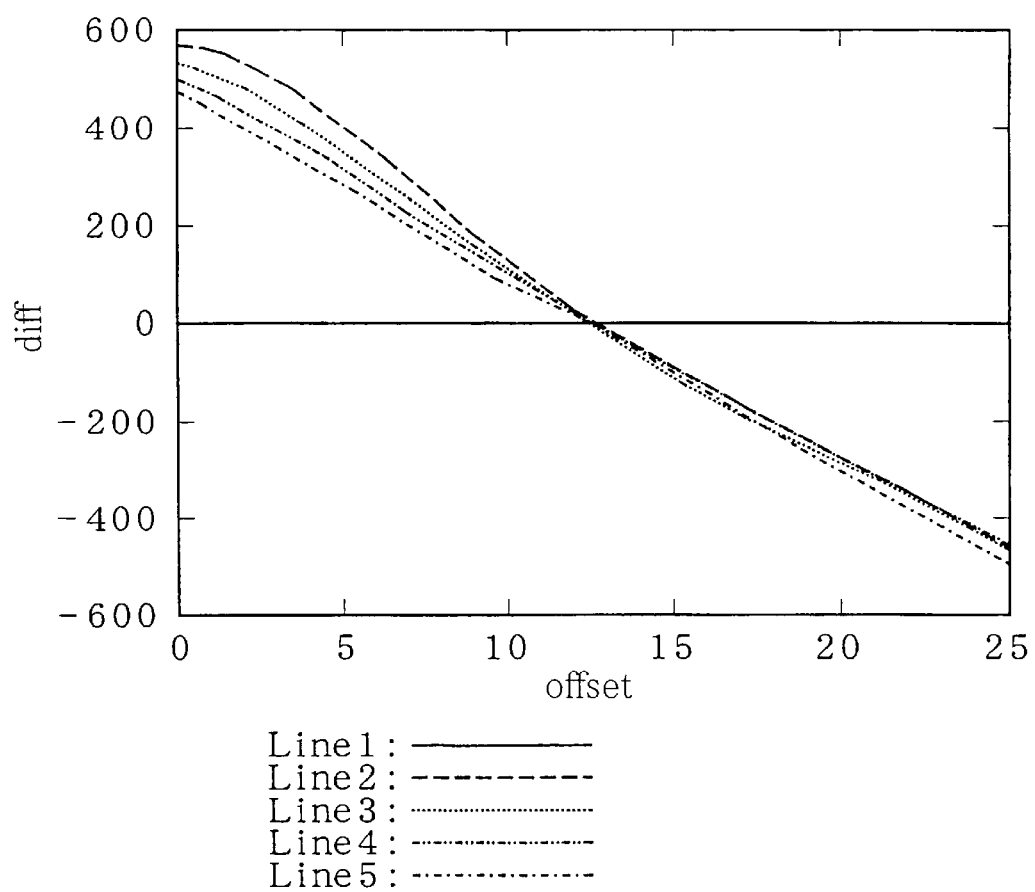
FIG. 33 shows a measured position determination graph.

FIG. 33 shows a measured position determination graph. As shown in FIG. 33, measured data is for only one tilt direction of the stylus 60.

When the stylus 60 is tilted toward another direction opposed to the one direction, the calculation, same as that performed when the stylus 60 is tilted in the one direction, is performed. By doing so, the dynamic correction can be also performed when the stylus 60 is tilted toward the another direction.

That is, the sign of the voltage difference diff is reversed and calculation is performed to resolve the position. After that, the deviation is subtracted from the reference position for calculation.

Figure 34:
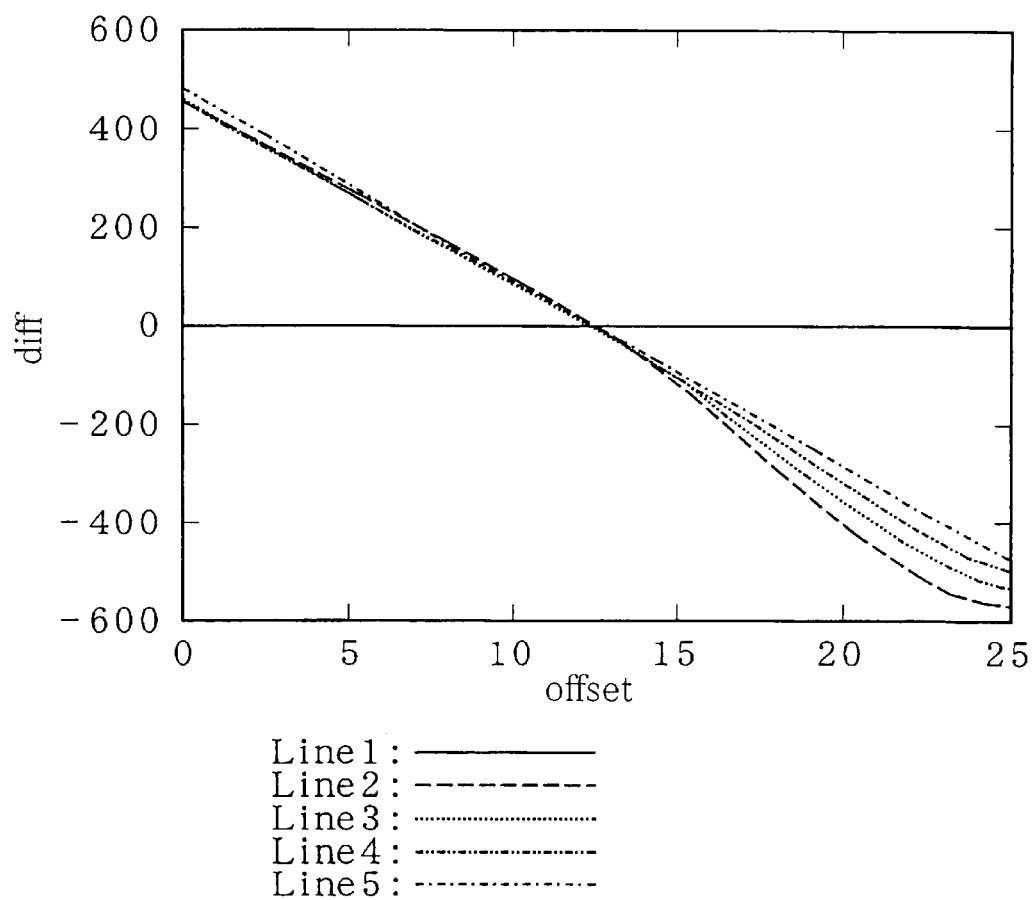
FIG. 34 shows a position determination graph when the stylus is tilted another direction opposed to the one direction.
Figure 35:
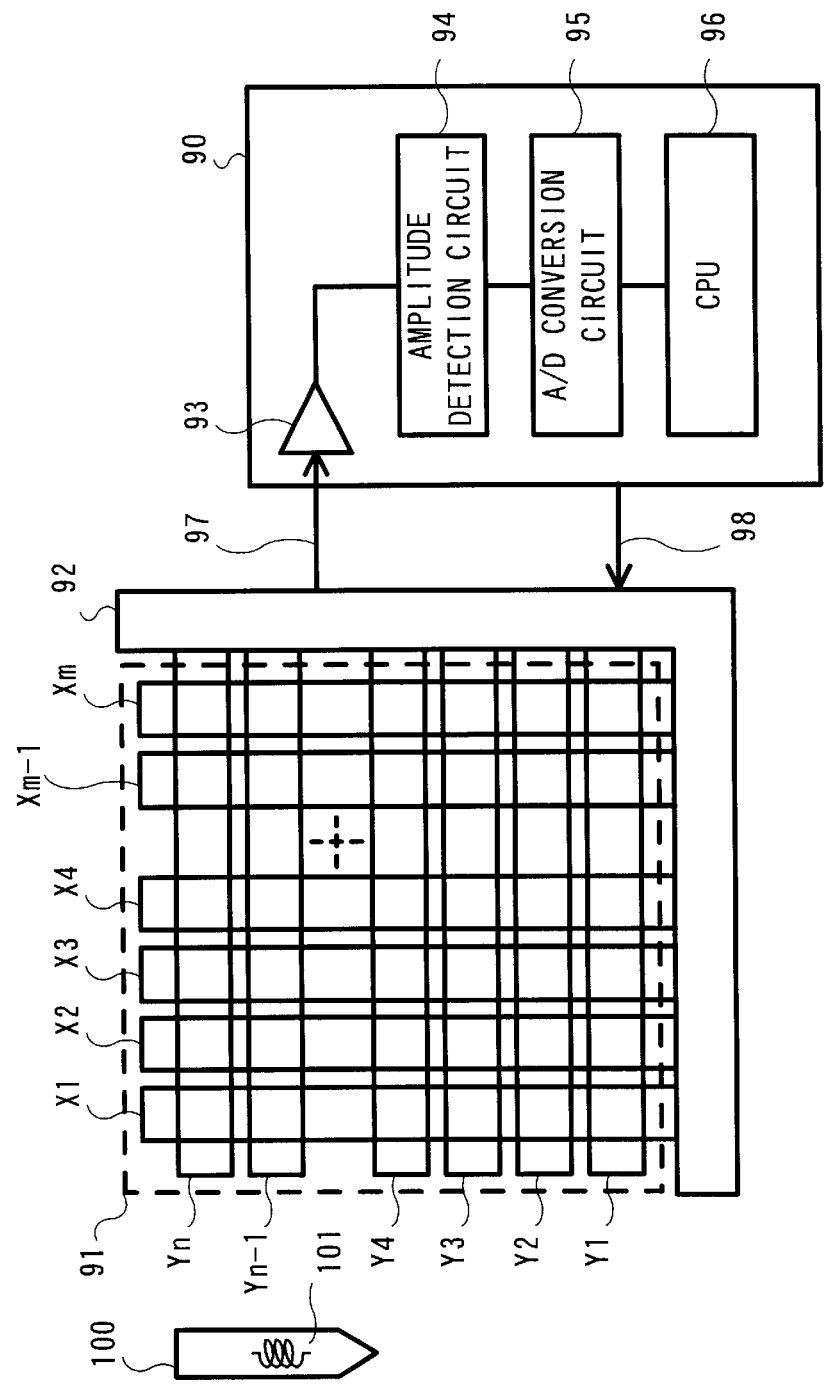
FIG. 35 illustrates a conventional coordinate reading device.

FIG. 34 shows a position determination graph when the stylus 60 is tilted another direction opposed to the one direction. The graph shown in FIG. 34 is the graph shown in FIG. 33, which is rotated 180 degrees relative to a Line 1 (diff=0).

Symmetrical PRE functions (position resolving graph) are expressed by one polynomial.

It is assumed that one PRE function is y=f(x) and another is y=g(x). The PRE function y=g(x) is equivalent to the PRE function y=f(x) that is rotated 180 degrees about an intercept a of the y-axis, so that the PRE function y=f(x) is defined as y=f1(x)+a(f1(x) has no constant term). Therefore, the rotated PRE function can be expressed by y−a=−f1(−x), thereby y=g(x)=−f1(−x)+a. The rotated PRE function is f1(x)+a wherein the sign of the coefficient of an even order (second order or higher) is reversed.

Thus, another PRE function can be obtained by reversing the sign of the coefficient of the even order.

While the invention has been described in detail with reference to a specific embodiment thereof, it would be apparent to those skilled in the art that various changes and modifications may be made therein without departing from the spirit of the invention.

What is claimed is:

1. A coordinate reading device, comprising: a coordinate input sheet that has a coordinate input area for inputting a coordinate by a coordinate input device generating an alternating magnetic field, and a plurality of loop coils laid under the coordinate input area;

a coil detecting device that detects a coil that generates a maximum signal level and a coil that generates a first signal level that is a larger signal level generated from one of coils adjacent to the coil generating the maximum signal level, in accordance with a strength of the alternating magnetic field generated from the coordinate input device;

a first storage device that stores a first relationship between the maximum signal level and the first signal level and a second relationship between the first relationship and a distance between a predetermined position and the coordinate input device on the coordinate input area;

a reading controller that reads a distance, corresponding to the first relationship obtained based on the detected maximum signal level and the first signal level, from the first storage device, and reads a positional coordinate of the coordinate input device on the coordinate input plane based on the read distance;

a signal level detecting device that detects a second signal level in which two signal levels detected from coils adjacent to each other of the plurality of coils are substantially equal to each other, in accordance with the strength of the alternating magnetic field;

a signal level calculating device that calculates a third relationship between a third signal level and a fourth signal level which are generated from at least two coils adjacent to the outside of the adjacent coils generating the second signal level detected by the signal level detecting device;

a second storage device that stores relationships between the second signal level and the third relationship and a correction; and a correcting device that corrects the second relationship stored in the first storage device by reading the correction, corresponding to the second signal level detected by the signal level detecting device and the third relationship calculated by the signal level calculating device, from the second storage device.

2. The coordinate reading device according to claim 1, wherein the correction stored in the second storage device is an amount of linear changes in the first relationship and the distance which are obtained in advance by measurement when a center axis of the coordinate input device is tilted against the coordinate input area from a state where the coordinate input device is perpendicular to the coordinate input area.

3. The coordinate reading device according to claim 1, wherein the correction stored in the second storage device is an expression that establishes the relationship between the first relationship and the distance when the center axis of the coordinate input device is tilted against the coordinate input area from a state where the coordinate input device is perpendicular to the coordinate input area, by the second signal level and the third relationship obtained in advance by the measurement.

4. The coordinate reading device according to claim 1, wherein the coordinate input device includes a power supply therein, and the second storage device stores relationships between the second signal level, the third relationship and voltage of the power supply and the correction when the center axis of the coordinate input device is tilted against the coordinate input area from a state where the coordinate input device is perpendicular to the coordinate input area, the coordinate reading device further comprising a warning device that warns of exhaustion of the power supply when the voltage of the power supply, which is read from the second storage device and corresponding to the second signal level detected by the second signal level detecting device and the third relationship calculated by the signal level calculating device, is lower than a predetermined voltage.

5. A method of reading a coordinate from a coordinate reading device comprising a coordinate input sheet that has a coordinate input area for inputting a coordinate by a coordinate input device generating an alternating magnetic field, and a plurality of loop coils laid under the coordinate input area, comprising the steps of:

detecting a coil that generates a maximum signal level and a coil that generates a first signal level that is a larger signal level generated from one of coils adjacent to the coil generating the maximum signal level, in accordance with a strength of the alternating magnetic field generated from the coordinate input device;

storing a first relationship between the maximum signal level and the first signal level and a second relationship between the first relationship and a distance between a predetermined position and the coordinate input device on the coordinate input area;

reading a distance, corresponding to the first relationship obtained based on the detected maximum signal level and the first signal level and reading a positional coordinate of the coordinate input device on the coordinate input plane based on the read distance;

detecting a second signal level in which two signal levels detected from coils adjacent to each other of the plurality of coils are substantially equal to each other, in accordance with the strength of the alternating magnetic field;

calculating a third relationship between a third signal level and a fourth signal level which are generated from at least two coils adjacent to the outside of the adjacent coils generating the detected second signal level;

storing relationships between the second signal level and the third relationship and a correction; and correcting the stored second relationship by reading the correction, corresponding to the detected second signal level and the calculated third relationship.

6. The method of claim 5, wherein the stored correction is an amount of linear changes in the first relationship and the distance which are obtained in advance by measurement when a center axis of the coordinate input device is tilted against the coordinate input area from a state where the coordinate input device is perpendicular to the coordinate input area.

7. The method of claim 5, wherein the stored correction is an expression that establishes the relationship between the first relationship and the distance when the center axis of the coordinate input device is tilted against the coordinate input area from a state where the coordinate input device is perpendicular to the coordinate input area, by the second signal level and the third relationship obtained in advance by the measurement.

8. The method of claim 5, wherein the coordinate input device includes a power supply therein, further comprising the steps of:

storing relationships between the second signal level, the third relationship and voltage of the power supply and the correction when the center axis of the coordinate input device is tilted against the coordinate input area from a state where the coordinate input device is perpendicular to the coordinate input area; and warning of exhaustion of the power supply when the voltage of the power supply, which is read from the second storage device and corresponding to the detected second signal level and to the third relationship, is lower than a predetermined voltage.

9. A program for reading a coordinate from a coordinate reading device comprising a coordinate input sheet that has a coordinate input area for inputting a coordinate by a coordinate input device generating an alternating magnetic field, and a plurality of loop coils laid under the coordinate input area, the program comprising:

a routine for detecting a coil that generates a maximum signal level and a coil that generates a first signal level that is a larger signal level generated from one of coils adjacent to the coil generating the maximum signal level, in accordance with a strength of the alternating magnetic field generated from the coordinate input device;

a routine for storing a first relationship between the maximum signal level and the first signal level and a second relationship between the first relationship and a distance between a predetermined position and the coordinate input device on the coordinate input area;

a routine for reading a distance, corresponding to the first relationship obtained based on the detected maximum signal level and the first signal level and reading a positional coordinate of the coordinate input device on the coordinate input plane based on the read distance;

a routine for detecting a second signal level in which two signal levels detected from coils adjacent to each other of the plurality of coils are substantially equal to each other, in accordance with the strength of the alternating magnetic field;

a routine for calculating a third relationship between a third signal level and a fourth signal level which are generated from at least two coils adjacent to the outside of the adjacent coils generating the detected second signal level;

a routine for storing relationships between the second signal level and the third relationship and a correction; and a routine for correcting the stored second relationship by reading the correction, corresponding to the detected second signal level and the calculated third relationship.

10. The program of claim 9, wherein the stored correction is an amount of linear changes in the first relationship and the distance which are obtained in advance by measurement when a center axis of the coordinate input device is tilted against the coordinate input area from a state where the coordinate input device is perpendicular to the coordinate input area.

11. The program of claim 9, wherein the stored correction is an expression that establishes the relationship between the first relationship and the distance when the center axis of the coordinate input device is tilted against the coordinate input area from a state where the coordinate input device is perpendicular to the coordinate input area, by the second signal level and the third relationship obtained in advance by the measurement.

12. The program of claim 9, wherein the coordinate input device includes a power supply therein, the program further comprising:

a routine for storing relationships between the second signal level, the third relationship and voltage of the power supply and the correction when the center axis of the coordinate input device is tilted against the coordinate input area from a state where the coordinate input device is perpendicular to the coordinate input area; and a routine for warning of exhaustion of the power supply when the voltage of the power supply, which is read from the second storage device and corresponding to the detected second signal level and the third relationship, is lower than a predetermined voltage.

* * * * *

UNITED STATES PATENT AND TRADEMARK OFFICE
CERTIFICATE OF CORRECTION

PATENT NO.      : 6,778,167 B2
DATED           : August 17, 2004
INVENTOR(S)     : Tsuyoshi Ohashi It is certified that error appears in the above-identified patent and that said Letters Patent is hereby corrected as shown below:

Title page,
Item [30], Foreign Application Priority Data, should read:

-- [30]          Foreign Application Priority Data
         Sept. 4, 2000    (JP)    ……………..2000-266491 --

Signed and Sealed this

Fourth Day of January, 2005

JON W. DUDAS
*Director of the United States Patent and Trademark Office*